(12) United States Patent
Thomas et al.

(10) Patent No.: US 10,277,813 B1
(45) Date of Patent: Apr. 30, 2019

(54) REMOTE IMMERSIVE USER EXPERIENCE FROM PANORAMIC VIDEO

(71) Applicant: Amazon Technologies, Inc., Seattle, WA (US)

(72) Inventors: Jim Oommen Thomas, Seattle, WA (US); Paul Aksenti Savastinuk, Shoreline, WA (US); Cheng-Hao Kuo, Seattle, WA (US); Tsz Ho Yu, Sunnyvale, CA (US); Ross David Roessler, Seattle, WA (US); William Evan Welbourne, Seattle, WA (US); Yinfei Yang, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 593 days.

(21) Appl. No.: 14/751,024

(22) Filed: Jun. 25, 2015

(51) Int. Cl.
*H04N 7/18* (2006.01)
*G06T 11/60* (2006.01)
*H04N 5/232* (2006.01)

(52) U.S. Cl.
CPC ......... *H04N 5/23238* (2013.01); *G06T 11/60* (2013.01); *H04N 7/181* (2013.01)

(58) Field of Classification Search
CPC ..... H04N 5/23238; H04N 7/181; G06T 11/60
USPC ......................................... 348/36, 143, 148
See application file for complete search history.

(56) References Cited

U.S. PATENT DOCUMENTS

| | | | |
|---|---|---|---|
| 6,035,060 A | 3/2000 | Chen et al. | |
| 2007/0036456 A1 | 2/2007 | Hooper | |
| 2007/0279494 A1 | 12/2007 | Aman et al. | |
| 2010/0014780 A1 | 1/2010 | Kalayeh | |
| 2015/0055929 A1* | 2/2015 | Van Hoff | ................ G11B 27/11 386/201 |
| 2016/0295108 A1 | 10/2016 | Cao | |
| 2016/0368417 A1 | 12/2016 | Bassi et al. | |

OTHER PUBLICATIONS

Office action for U.S. Appl. No. 14/750,975, dated Mar. 24, 2017, Yu, "Color Adjustment of Stitched Panoramic Video", 20 pages.
"Meet the V.360," VSN Mobil, retrieved from <<https://www.vsnmobil.com/products/v360>> on Jun. 19, 2015, 1 page.
Office action for U.S. Appl. No. 14/750,975, dated Oct. 3, 2017, Yu, "Color Adjustment of Stitched Panoramic Video", 23 pages.

* cited by examiner

*Primary Examiner* — On S Mung
(74) *Attorney, Agent, or Firm* — Lee & Hayes, P.C.

(57) ABSTRACT

A viewing device, such as a virtual reality headset, allows a user to view a panoramic scene captured by one or more video capture devices that may include multiple cameras that simultaneously capture 360° video data. The viewing device may display the panoramic scene in real time and change the display in response to moving the viewing device and/or changing perspectives by switching to video data being captured by a different video capture device within the environment. Moreover, multiple video capture devices located within an environment can be used to create a three-dimensional representation of the environment that allows a user to explore the three-dimensional space while viewing the environment in real time.

20 Claims, 7 Drawing Sheets

REMOTE IMMERSIVE USER EXPERIENCE FROM PANORAMIC VIDEO

BACKGROUND

Video or images may be captured and sent to a viewer for playback or static viewing in a virtual reality type experience. However, the viewer is somewhat limited in what can be viewed. For example, in the case of a video, the viewer can only view the video using the same point of reference in which the video was captured. In other words, the orientation of the camera capturing the video determines the field of view when the video is later viewed. Thus, the frame of reference of the video is fixed by the orientation of the camera and cannot be subsequently adjusted. Accordingly, a user may not be able to view the entire environment in an immersive way.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figures 1A, 1B:
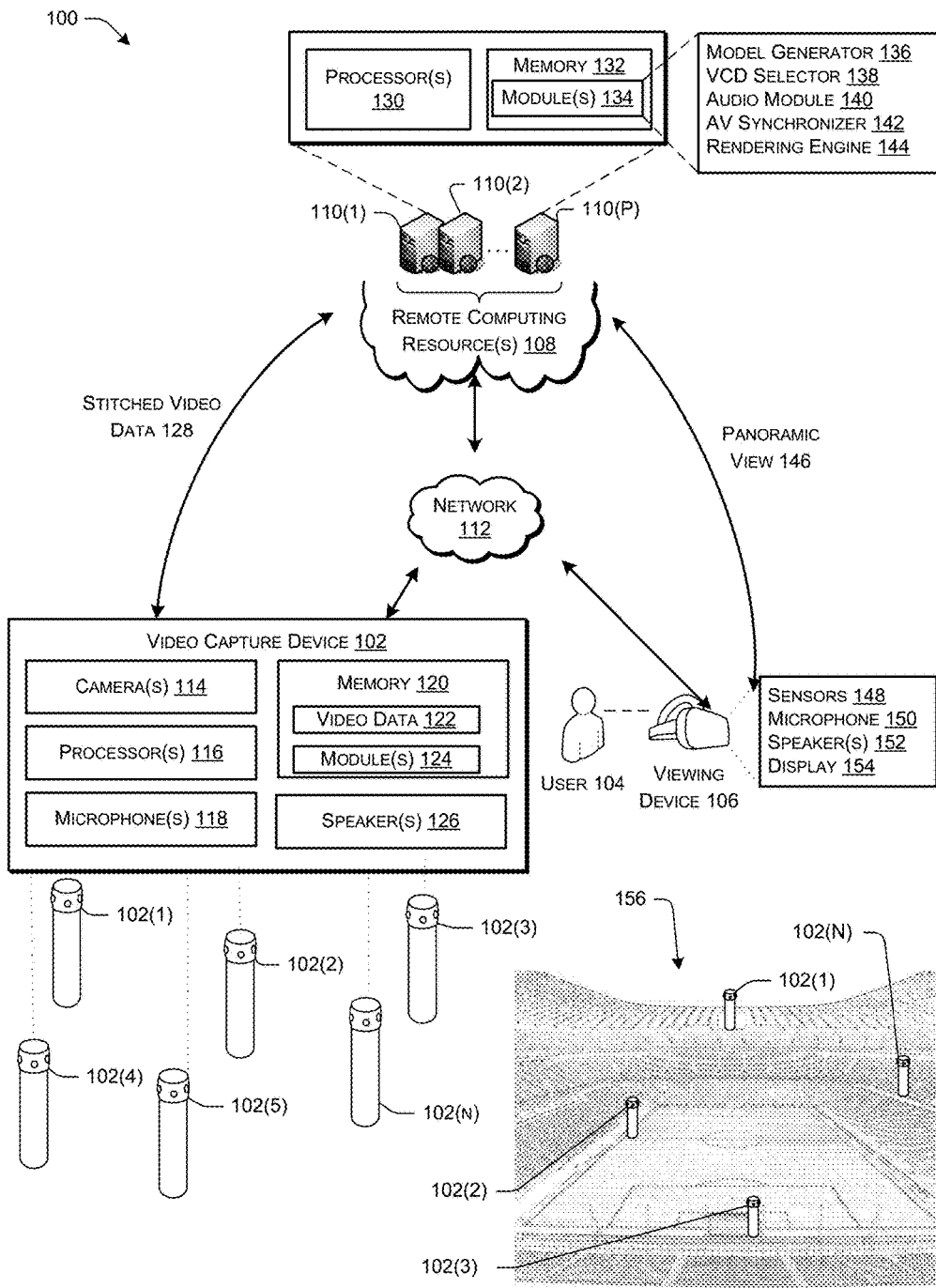
FIG. 1a illustrates an example system for generating and/or streaming panoramic video data captured by one or more video capture devices for subsequent viewing using a viewing device.
FIG. 1b illustrates a sample environment in which multiple video capture devices might be positioned.

Virtual reality content has become more widely desired by consumers. The systems and/or processes described herein may generate a panoramic video from video data captured by multiple cameras of a video capture device and/or multiple video capture devices. More particularly, the systems and/or processes described herein can be used with a video capture device having multiple cameras (e.g., four cameras) that each simultaneously (or nearly simultaneously) capture video data of the surrounding environment. As a result, provided that the video capture device includes multiple cameras, each of the multiple cameras of the video capture device may simultaneously capture video data corresponding to multiple, different fields of view. Accordingly, provided that the video capture device included four different cameras that each capture video data, the video capture device may be configured to capture up to a 360° video and/or a 360° image. Of course, other devices are capable of capturing up to a 360° video and/or a 360° image and can be used with the systems and methods describe herein. For example, other imaging systems may rely upon rotating a camera to capture an image or video that has a field of view that is larger than the imaging sensor can capture if stationary. Other such examples include imaging systems that rely on a light redirecting device to reflect or redirect light on to an imaging sensor, such as mirrors, prisms, fiber optics, or other suitable device that allows an imaging sensor to capture an image or video that has a field of view that is larger than what the imaging sensor can capture without the light redirecting device.

In embodiments using multiple cameras to capture the video data, the video capture device and/or one or more remote computing resources (e.g., a server device) may stitch together the video data. That is, provided that four cameras simultaneously captured four streams of video data, the video data may be stitched together to generate a 360° panoramic video that represents the environment surrounding the video capture device. The systems and/or processes described herein may then stream the panoramic video to a remote viewing device in real time. As used herein, the phrase real time also includes near real time and substantially real time. These phrases may be used interchangeably and refer to operations happening as soon as practicable taking into account delays (e.g., a fraction of a second, one second, etc.) attributable to hardware or software latency, network traffic, FCC regulations, device interoperability, networking protocols, and the like.

The remote viewing device is associated with a user and allows the user to experience the environment surrounding the video capture device, which is depicted in the video data captured by the multiple cameras of the video capture device. More particularly, the viewing device may be configured to control the view being displayed on the viewing device. For example, the viewing device may be configured with one or more sensors (e.g., a gyroscope, accelerometer, or compass) and motion of the viewing device may cause the field of view being displayed to change/update. For instance, if the viewing device rotates to the right, the field of view being displayed may likewise rotate to the right a corresponding amount.

Furthermore, the systems and/or processes presented herein provide for multiple video capture devices to capture video data for presentation to the viewing device associated with the user. For example, a viewing device may be configured with a control to change the perspective from one video capture device to another video capture device. Where multiple video capture devices are within the same general area, a display device may be able to display the environment from more than one spatial perspective by switching the displayed view from one video capture device to another.

In addition to switching the display from one video capture device to another, the viewing device may be able to display a three-dimensional model of the environment in which the video capture devices are located. In this way, the viewing device may be configured to smoothly transition the display from the perspective of one video capture device to the perspective of another video capture device.

Moreover, the systems and/or processes presented herein may be configured to create and display a three-dimensional model of the environment surrounding the video capture devices, which may allow the user associated with the viewing device to explore the environment in three dimensions. For instance, the viewing device may include one or more motion sensors that can sense the movement of the viewing device and update the view being displayed based upon the motion detected by the one or more motion sensors. For example, the motion of the viewing device may cause the display being viewed to rotate from side to side, tilt up and/or down, or move throughout the three dimensional environment by sensing translation motion of the viewing device.

The systems and/or processes presented herein may capture and save the video data from the video capture device(s) for later viewing. Alternatively, the panoramic video data captured from the video capture devices(s) may be streamed to the viewing device in real time.

FIG. 1a illustrates an example system 100 that is configured to generate panoramic video from video data captured from multiple cameras of one or more video capture devices 102 (interchangeably referred to as "device" or "devices"). As used herein, when referring to a singular video capture device 102, multiple video capture devices may also be contemplated. The system described herein may implement any number of video capture devices 102, such as video capture devices 102(1), 102(2), 102(3), 102(4), 102(5), . . . , 102(N). The video capture device 102 may be included in an environment (e.g., home environment, outdoor environment, sporting environment, entertainment environment, etc.). The video capture device 102 may be placed in a fixed location within the environment, such as on a table or a stand, or may be carried by a user or mounted to a vehicle. In various embodiments, a user 104 may have one or more viewing devices 106, which may be used to perform various operations. Here, the viewing device 106 may be utilized by the user 104 to receive panoramic video generated by the system 100. In addition to the video capture device 102, the system 100 may include one or more remote computing resource(s) 108, which may be implemented as one or more servers 110(1), 110(2), . . . , 110(P), and one or more networks 112.

As illustrated in FIG. 1a, the video-capture device 102 may include at least one or more cameras 114, one or more processors 116, one or more microphones 118 and memory 120. The memory 120 may store video data 122 captured by the multiple cameras 114 and one or more modules 124 that perform various operations. In various embodiments, each of the cameras 114 of the video capture device 102 may capture video data 122, such as a stream of video, as well as still images. For instance, provided that the video-capture device 102 included four different cameras 114, each of the four cameras 114 may capture a different video stream corresponding to a field of view. The cameras 114 may be positioned on each side of the video capture device 102, such that each camera 114 is positioned approximately 90° with respect to its adjacent cameras 114 (e.g., cameras 114 to the left and the right). That is, a first axis in which a first camera 114 is oriented may be approximately 90° from a second axis in which adjacent cameras 114 are oriented. Since the field of view of a first camera 114 may overlap with the field of views of adjacent cameras 114, the multiple cameras 114 of the video capture device 102 may capture 360° of video, which will be discussed in additional detail with respect to FIG. 2.

The cameras 114 of the video capture device 102 may capture video data 122 of the environment surrounding the video capture device 102. The video capture device 102 may be set on a surface within an environment, which may allow the multiple cameras 114 to capture video of the environment. For instance, the video capture device 102 may be set on a table within a room of a home to capture video of activity (e.g., a birthday party) taking place within the room. Due to multiple cameras 114 simultaneously capturing video, the video capture device 102 may capture video in multiple different directions, thereby capturing video of an entirety of the events taking place within the room, provided that those events are within the field of view of at least one of the cameras 114. The video capture device 102 may also be held by the user 104, or may be affixed the user 104 in some manner (e.g., via a strap, a clip, a platform, etc.). Accordingly, as the user 104 moves within an environment (e.g., a room, the beach, a hike in the mountains, etc.), the video capture device 102 may capture video of events occurring within that environment. The cameras 114 may continuously capture video, or may begin/cease capturing video in response to user input (e.g., actuating a button, a voice command, etc.).

As stated above, the video data 122 may represent video captured by each of the multiple cameras 114 of the video capture device 102. The one or more modules 124 of the video capture device 102 may include software and/or other functionality that may stitch together the video data 122 captured by the multiple cameras 114. That is, provided that the video data 122 is captured by four different cameras 114, the modules 124 may stitch video data 122 captured by a first camera 114 with the video data 122 captured by cameras 114 adjacent to the first video camera 114. As a result, stitching of the video data 122 may result in stitched video data 128, where the stitched video data 128 provides a view that includes up to, and including, a 360° view that depicts the environment surrounding the video capture device 102. The stitching of the video data 122 may also be performed by the remote computing resources 108, or by a combination of the video capture device 102 and the remote computing resources 108, and is discussed in additional detail with respect to FIG. 2.

In other embodiments, the modules 124 may include speech recognition software or other speech recognition functionality. The video capture device 102 may include one or more microphones 118 that detect voice commands uttered by the user 104 and that generate one or more audio signals corresponding to the voice commands. The speech recognition software may process the audio signals to recognize words included within the voice command. As a result, the video capture device 102 may recognize voice commands uttered by the user 104 (e.g., start recording video, stop recording video, take a photograph, etc.) and perform corresponding operations as a result (e.g., instruct the cameras 114 to record video, instruct the cameras 114 to cease recording video, instruct the cameras 114 to capture a still image, etc.).

The microphones 118 may also capture ambient sounds from the environment in which the video capture device 102 is situated. The video capture device 102 may have one, two, three, four, or more microphones 118. In some instances, the video capture device 102 incorporates three microphones 118 which can be configured to determine the direction in which received audio is emanating from. For example, by identifying the time difference in which sound reaches the microphones 118, the video capture device 102, or the remote computing resources 108, can calculate the direction from which the sound originated. This audio directional calculation can be used to identify a likely source of interest in the captured video data 122 and can be used to determine a likely primary subject that a user may want to view. A primary subject is any subject that a user may likely determine is the primary scene that a viewer will desire to view. Accordingly, the sound cues can be used to help determine which camera 114 of the video capture device should be given more weight, such as for determining exposure settings, color correction, focus distance, and other video capture settings. The sound cues may also be used in part to determine an initial field of view within the video. In other words, when the video is created and presented, the primary subject (i.e., the source of the audio) may be presented in the center of the field of view.

The video capture device 102 may include one or more user interfaces (e.g., graphical user interfaces) and/or one or more speakers 126 that allow the video capture device to visually and/or audibly output information to the user 104, which may allow the user 104 to interact with the video capture device 102. For instance, the user 104 of the viewing device 106 may be able to speak to a user of the video capture device 102. Moreover, the user 104 of the viewing device 106 may be able to control aspects of the video capture device 102, or the remote computing resources 108 through voice commands.

In some instances, the video capture device 102 may operate in conjunction with or may otherwise utilize computing resources that are remote from the video capture device 102 (i.e., the remote computing resources 108). For instance, the video capture device 102 may couple to the remote computing resources 108 over the network 112. As illustrated, and as set forth above, the remote computing resources 108 may be implemented as one or more servers 110(1), 110(2), . . . , 110(P) and may, in some instances, form a portion of a network-accessible computing platform implemented as a computing infrastructure of processors 130, storage (e.g., memory 132), software (e.g., modules 134), data access, and so forth that is maintained and accessible via the network 112, such as the Internet. The remote computing resources 108 may not require end-user knowledge of the physical location and configuration of the system that delivers the services. Common expressions associated for these remote computing resources 108 may include "on-demand computing", "software as a service (SaaS)", "platform computing", "network-accessible platform", "cloud services", "data centers", and so forth.

The servers 110(1)-(P) may include the processor 130 and the memory 132, which may include one or more modules 134 and which may store or otherwise have access to some or all of the components described with reference to the memory 120 of the video capture device 102. For instance, the memory 132 may have access to and utilize the modules 124 that perform video stitching and/or speech recognition operations. In some examples, the video capture device 102 may upload the video data 122 and/or the stitched video data 128 to the remote computing resources 108 for processing, given that the remote computing resources 108 may have a computational capacity that exceeds the computational capacity of the video capture device 102. Therefore, the video capture device 102 may utilize the functionality of the remote computing resources 108 for performing relatively complex analysis on video data 122 captured from the environment.

Alternatively, or in addition to the video capture device 102 stitching the video data 122 to generate the stitched video data 128, the video capture device 102 may transmit the raw video data 122 captured by the multiple cameras 114 of the video capture device 102 to the remote computing resources 108. The remote computing resources 108 may then stitch together the video data 122 to generate the stitched video data 128.

The modules 134 of the remote computer resources 108 may provide certain functionality in the receiving, processing, and delivering of the panoramic video to the viewing device 106. For example, the modules 134 may include a model generator 136 that corresponds the stitched video data 128 to one or more models for viewing. For example, the stitched video data 128 may be mapped to a cylinder to create a cylindrical model for viewing. Furthermore, depending on the number and relative positioning of cameras 114 within the video capture device 102, the model generator 136 may map the stitched image data to a hemisphere or a sphere. As discussed later in further detail, the mapping is performed by projecting the stitched video data onto a shape, such as a cylinder, hemisphere, or sphere, and then correcting for aberrations inherent with projecting a two-dimensional (2D) image onto a three-dimensional (3D) shape.

In addition, the model generator 136 may be configured to process the video data 122 or the stitched video data 128 captured from multiple video capture devices 102 simultaneously to create a three-dimensional model of the environment in which multiple video capture devices 102 are located. For example, where multiple video capture devices 102 are located within proximity to one another, the video data 122 captured by each video capture device 102 may be received at the remote computing resources 108. The remote computing resources 108 may process the multiple streams of video data 122 and then create a three-dimensional model of the environment in which the video capture devices 102 are located. This may be performed, in part, by feature recognition by comparing objects found within the video data 122 captured by each video capture device 102. Alternatively, the video capture devices 102 may include global positioning data that can be used, in part, to create the three-dimensional model.

The modules 134 may further include a video capture device selector 138 (VCD selector). In the instances where there are multiple video capture devices 102 located within an environment, the VCD selector 138 can switch perspectives by selecting the video data 122 from different video capture devices 102. In this way, a user 104 can view multiple angles of an environment by viewing the stitched video data 128 captured by the different video capture devices 102.

An audio module 140 may be responsible for encoding and/or decoding audio signals as the audio data is sent to/from the video capture devices 102 and sent to/from the viewing device 106. Moreover, the audio module 140 may be configured to analyze the audio signals received from the microphones 118 of the video capture device 102 such as to calculate the direction of the audio source.

In the example where a video capture device 102 may be sitting in the middle of a table during a birthday party, the video capture device 102 may capture video data 122 that contains each attendee sitting around the table giving their birthday wishes to the guest of honor. The audio module 140, in addition to localizing the audio based upon which microphone 118 has the loudest signal, may also be able to calculate the direction from which each attendee is speaking. In such cases, the audio may be spatially related to the video data 122. For instance, assuming the video capture device 102 has an initial field of view facing the guest of honor and the attendee speaking is situated to the right of the video capture device 102, when a user 104 views the stitched video data 128, the audio may emanate from the right side of the sound field generated by speakers or headphones. That is, to a viewer, the audio will be coming from the right side, which corresponds to where the guest is speaking is in relation to the video capture device 102.

An audio video (AV) synchronizer 142 may be configured to relate the audio signal to the video signal such that the audio and video are synchronized with one another (i.e., audio/video synchronization). This may be done at the remote computing resources 108 such as by correlating time stamps between the audio data and the video data 122. Alternatively, the audio/video synchronization may be performed at the video capture device 102 and may happen during video capture. Moreover, each camera 114 of each video capture device 102 may have a microphone 118 associated with it and the audio captured by each microphone 118 may be associated with video data 122 captured by the associated camera 114.

The remote computing resources 108 may additionally include a rendering engine 144 that is configured to decode the audio and video data 122 captured by the video capture devices 102 and produce a panoramic view 146 that is viewable at the viewing device 106. As used herein, the term panoramic view 146 refers to a portion of the 360° stitched video data 128 that is viewable at the viewing device 106, plus a buffer at the boundary that is not immediately viewable at the viewing device 106. In some cases, the rendering engine 144 renders less than a full 360° view of the stitched video data 128. For example, a viewing device 106 may be configured to view a specified field of view having a predetermined viewing angle. For purposes of this discussion, the viewing angle is the angle subtended by a straight line from each side of the display screen to the center point of the viewer. It should be appreciated that the viewing angle can vary widely depending on viewing screen size and the distance to the viewer. In some cases, the viewing angle may be 45°, while in other cases, may be as high as 90°, 120°, or more.

Additionally, the viewing angle can be established by the remote computing resources 108 independently of the configuration of the viewing device 106. For example, the rendering engine 144 may render a panoramic view 146 that corresponds with 100° of the stitched video data 128. The limitations of the display device 106 may ultimately determine how much of the rendered panoramic view 146 is viewable at any given time on the viewing device 106. Moreover, the viewing angle may be variable and adjustable by the user 104 during viewing of the panoramic view 146. The panoramic view 146 may be stitched video data 128 that has been stored for later playback, or may be streaming video being displayed in real time, or in near real time, as it is being captured by one or more video capture devices 102.

The rendering engine 144 may be configured to render a portion of the stitched video data 128 and deliver it to the viewing device 106 as a panoramic view 146. The viewing device 106 may be any device that is capable of displaying an image or video to the user 104. In some instances, the viewing device 106 may be a headset, such as a virtual reality headset, in which a display screen is worn on the head of the user 104 or held up to the eyes of a user such that the display screen is positioned in close proximity to the eyes of the user 104. In some cases, the viewing device 106 may display two separate images designed to be viewed by the left eye and the right eye of the user.

Alternatively, the viewing device 106 may be a portable device, such as a smartphone, a tablet, or other portable device having a screen that is capable of displaying a panoramic view, such as images or video. The viewing device 106 may additionally be a television, a computer screen, or a front or rear projection screen.

In some configurations, the viewing device 106 includes one or more sensors 148, one or more microphones 150, one or more speakers 152, and one or more displays 154. The sensors 148 may be inertial measurement units (e.g., gyroscope(s), accelerometer(s)), a compass, global positioning system, or other sensors) configured to detect the orientation, location, direction, or position of the viewing device 106.

The sensors 148 may be able to provide information to the remote computing resources 108 regarding the orientation and/or motion of the viewing device 106 (collectively, motion information). This information can be used to determine which portion of stitched video data 128 should be rendered by the rendering engine 144 and sent to the viewing device 106. As an example, the stitched video data 128 may have an initial field of view, which may be referred to as a default view. The default view is the initial field of view that is rendered and viewable at the viewing device 106. In use, a user 104 can rotate, translate, or otherwise move the viewing device 106 and the field of view will change correspondingly. For example, where the viewing device 106 comprises a virtual reality headset, as the user 104 turns his/her head side to side, the panoramic view 146 displayed on the viewing device 106 will likewise appear to pan side to side a corresponding amount. Thus, as the user 104 moves the viewing device 106, the panoramic view 146 will be updated in response to the motion of the viewing device 106, and the user can explore the panoramic view 146 by moving the viewing device 106.

The rendering engine 144, based upon the motion information form the viewing device 106, may render a portion of the stitched video data 128 viewable in the viewing device 106 and may further render a region of stitched video data 128 outside the field of view of the viewing device 106. Rendering a portion of the stitched video data 128 that is outside the field of view of the viewing device 106 provides a buffer region such that when the viewing device 106 moves, there is a portion of the stitched video data 128 that is already rendered and is available for immediate viewing in the viewing device 106. This may help to alleviate some of the rendering delay that may happen between sensing motion data of the viewing device 106 and updating the panoramic view 146 within the viewing device 106.

The viewing device 106 may further include a microphone 150 that allows the viewing device 106 to capture speech or voice commands from the user 104. In some instances, the viewing device 106 is able to send voice commands to the remote computing resources 108 and/or the video capture device 102. For example, the user 104 may issue a voice command for the video capture device 102 to start or stop recording the stitched video data 128. As non-limiting examples, additional voice commands may include commands that cause the video capture device 102 and/or the remote computing resources 108 to capture and save a panoramic image, to switch to a perspective provided by a different video capture device 102, and increase a zoom level of the panoramic view 146, among others. Moreover, the microphone 150 may be used to communicate with a user associated with one or more of the video capture devices 102.

For example, a user associated with the video capture device 102 may wish to show a friend the view from a vacation location. By using the system and/or processes described herein, voice communication may be established between the video capture device 102 and the viewing device 106 and the two users may talk to each other as they both interact with the environment surrounding the video capture device—the user associated with the video capture device 102 experiencing the environment physically while the user 104 of the viewing device 106 can experience the environment virtually and the users can talk as they share the experience.

To this end, the viewing device 106 may include one or more speakers 152. Not only will this facilitate communication, it will also allow a user 104 of the viewing device 106 to hear the ambient sounds (e.g., voices of individuals depicted in the video, wildlife, waves crashing, etc.) captured by the microphones 118 of the video capture device 102.

The video capture device 104, the user device 106, and/or the remote computing resources 108 may communicatively couple to the network 112 via wired technologies (e.g., wires, USB, fiber optic cable, etc.), wireless technologies (e.g., RF, cellular, satellite, Bluetooth, etc.), or other connection technologies. The network 112 may be representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

Regardless of whether the video stitching occurs locally on the video capture device 102 and the stitched video data 128 is transmitted to the remote computing resources 108, or whether the video stitching is performed remotely from the video capture device 102 (e.g., the video data 122 is sent to the remote computing resources 108 via the network 112 for stitching), the remote computing resources 108 may further process the stitched video data 128. More particularly, the remote computing resources 108, and in particular, the one or more modules 134, may apply, run, and/or execute one or more algorithms with respect to the stitched video data 128 to compensate for irregularities in the stitched video data 128, such as abrupt color changes when the cameras 114 have different video capture settings.

Moreover, the modules 134 may include algorithms such as human detection or object detection algorithms to identify people and/or objects (e.g., a house, a ball, etc.) depicted in the stitched video data 128. In addition, the algorithms may include scene detection algorithms to determine scenes depicted within frames of the stitched video data 128, such as a beach scene, a forest scene, a home environment, and so on. The algorithms may also include background detection algorithms that determine the background depicted within the frames of the stitched video data 128. As a result, the remote computing resources 108 may execute the above algorithms to select a default view to present to a user 104 of the viewing device 106.

FIG. 1b depicts a sample environment, such as a sporting event stadium 156, in which multiple video capture devices 102(1), 102 (2), 102(3), . . . , 102(N) might be positioned. For instance, a first video capture device 102(1) might be located near a scoreboard located in an elevated position in the stadium 156 to allow a user 104 to select this vantage point from which to view the environment surrounding the first video capture device 102(1). The user 104 may explore fields of view around the vicinity of the first video capture device 102(1) to see the scoreboard, the fans, and/or the action relating to the game being played in the stadium 156.

The user 104 may choose to view the environment from a different perspective, such as by selecting a second video capture device 102(2) located on the sidelines, or a third video capture device 102(3) positioned behind, or mounted to, a goal. Additional video capture devices 102(N) may be located in other locations, such as suspended above the field, mounted on a cross bar, or attached to a referee, for example.

Figure 2:
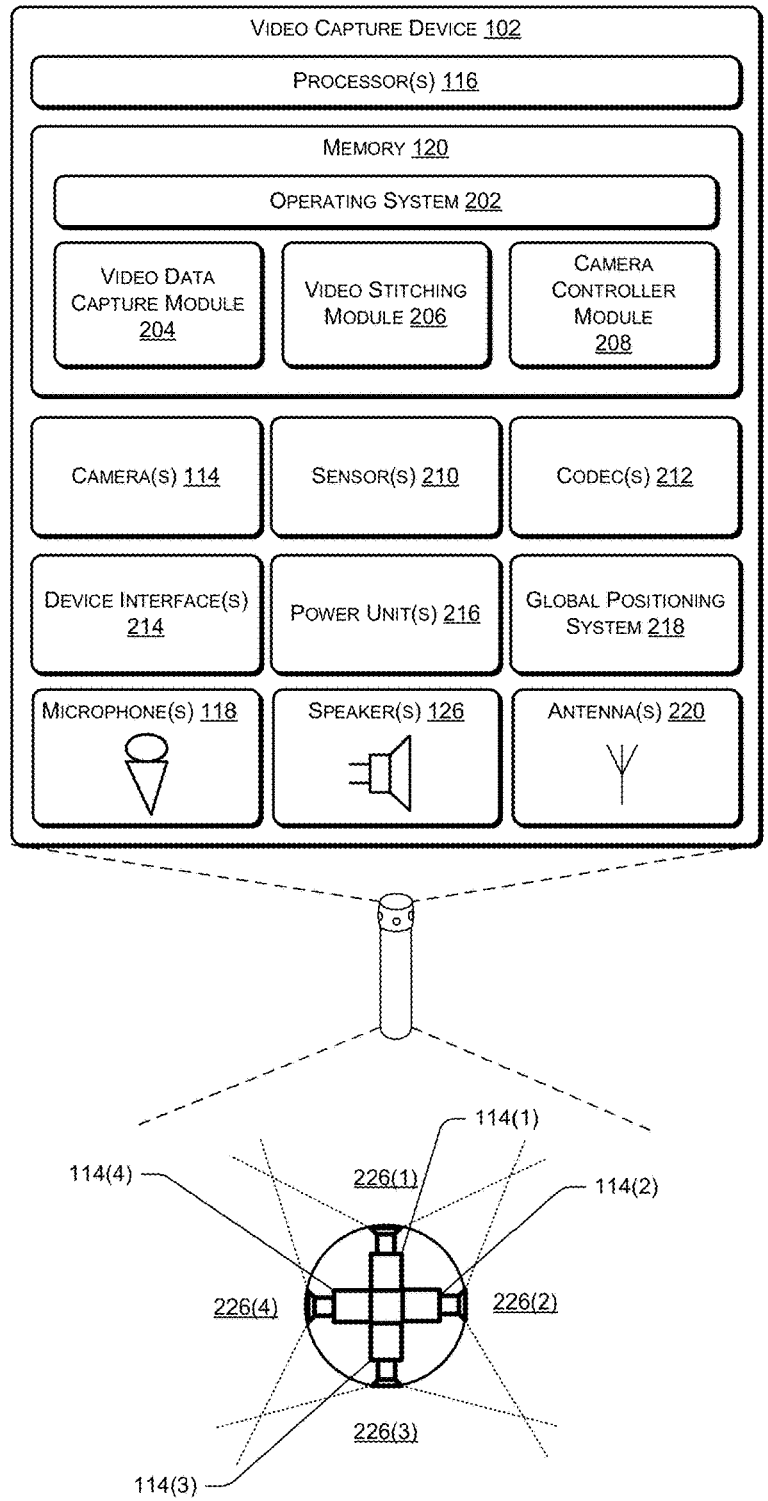
FIG. 2 illustrates an example of a video capture device that includes multiple cameras configured to capture video data used to generate and/or stream panoramic video and/or images.

FIG. 2 shows selected functional components and/or modules of one implementation of the video capture device 102 in additional detail. Generally, the video capture device 102 may be implemented as a standalone device that may be relatively simple or complex in terms of functional capabilities with input/output components, memory, and processing capabilities. For instance, the video capture device 102 may or may not have a keyboard, keypad, or other form of mechanical input in some implementations. The video capture device 102 may or may not have a display or touch screen to facilitate visual presentation and user touch input. Moreover, the video capture device 102 may be implemented with the ability to receive and output audio, video, and/or visual data, a network interface (wireless or wire-based), power, and processing/memory capabilities. As set forth above with respect to FIGS. 1a and 1b, the video capture device 102 may include multiple cameras 114 that capture video data 122 that is used to generate panoramic images 146.

In the illustrated implementation, the video capture device 102 may include the processor(s) 116 and the memory 120. In various embodiments, the processor(s) 116 may execute one or more modules 124 and/or processes to cause the video capture device 102 to perform a variety of functions, as set forth above and explained in further detail herein below. In some embodiments, the processor(s) 116 may include a central processing unit (CPU), a graphics processing unit (GPU), both CPU and GPU, or other processing units or components known in the art. Additionally, each of the processor(s) 116 may possess its own local memory, which also may store program modules, program data, and/or one or more operating systems. The processor 116 may include multiple processors 116 and/or a single processor 116 having multiple cores.

The memory 120 may include computer-readable storage media ("CRSM"), which may be any available physical media accessible by the processor(s) 116 to execute instructions stored on the memory 120. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by the processor(s) 116. As will be discussed in additional detail, the memory 120 may include an operating system 202, one or more modules 124, such as a video capture module 204 and a video stitching module 206, and a camera controller module 208.

In addition to the processor(s) 116 and the memory 120, the video capture device 102 may include multiple cameras 114. For instance, as described in additional detail below, the video capture device 102 may include four cameras 114 that are positioned on/within the video capture device 102 90°, or approximately 90°, from one another. Each of the multiple cameras 114 may capture video data 122, such as a video stream, within its corresponding field of view. As used herein, a video stream is a collection of sequential image frames captured by a single camera 114 of a video capture device 102. This is differentiated from stitched video data 128, which is a collection of image frames captured by multiple cameras 114 of a video capture device 102 that have been stitched together to form stitched video data 128. Stitched video data 128 may also be described as video streams that have been stitched together. The stitched video data 128 is created by a suitable stitching algorithm that corresponds the video streams such that the frames of the video streams that are stitched together were captured by the cameras 114 of the video capture device 102 at the same time.

As a result, by the four cameras 114 simultaneously capturing video data 122, the video capture device 102 may capture 360° (or any lesser field of view) of video surrounding the video capture device 102. For the purposes of this discussion, the cameras 114 may include any type of camera 114 (e.g., high definition (HD) camera) that is capable of capturing video and/or images (e.g., still images, panoramic images, etc.). Additionally, while this disclosure primarily discusses embodiments utilizing four cameras, it should be appreciated that some embodiments can utilize fewer (e.g., one, two, etc.) or more cameras 114, such as five, six, eight, or ten or more cameras.

The video capture device 102 may also include one or more sensors 210, codecs 212, device interfaces 214, power units 216, global positioning systems 218, microphones 118, speakers 126, and antennas 220. For instance, the sensors 210 may include a motion detector to determine/measure the motion and/or the velocity of motion (e.g., speed, rate, etc.) of the video capture device 102, an accelerometer to determine the acceleration of translational movement of the video capture device 102, an inertial measurement unit (IMU) to determine the velocity and orientation of the video capture device, a gyroscope to determine or maintain the orientation of the video capture device 102, an altimeter/altitude meter to determine the altitude of the video capture device 102, a compass to determine the orientation/direction of the video capture device 102, and/or any other type of sensor 210 utilized to determine the motion, velocity, acceleration, orientation, tilt, position, location, etc., of the video capture device 102.

In addition, the video capture device 102 may include one or more codecs 212 that are coupled to the microphone(s) 118 and/or the speaker(s) 126 to encode and/or decode audio signals generated by the microphone(s) 118. The codec(s) 212 may convert audio data and/or video data between different formats.

One or more device interfaces 214 (e.g., USB, broadband connection, etc.) may further be provided as part of the video capture device 102 to facilitate a wired connection to a network, such as network 112, or a plug-in network device that communicates with other wireless networks. Moreover, one or more power units 216 may further be provided to distribute power to the various components of the video capture device 102. The power unit(s) 216 may include hardware that enables the video capture device 102 to be plugged into an outlet, thereby providing power to the video capture device 102. Alternatively, or in addition, the power unit(s) 216 may correspond to one or more batteries (rechargeable or not) that may provide power to the video capture device 102. Provided that the video capture device 102 includes one or more batteries, the video capture device 102 may be carried and used by the user 104 while he/she moves between different locations.

In the illustrated example, the video capture device 102 may include a global positioning system 218 that may be coupled to one or more antennas 220 to facilitate a wireless connection to establish the position of the video capture device 102. The global positioning system 218 may allow for the remote computing resources 108 to find and associate two or more video capture devices 102 with a particular location or event.

For example, multiple video capture devices 102 may be positioned throughout an environment to capture an event, such as a parade, for example. Video capture devices 102 may be positioned on buildings, on top of poles, at a commentator's booth, on parade floats, and other locations. The global positioning system 218 in the video capture devices 102 may allow the video capture devices 102 located within proximity of one another, such as along the parade route, to be associated with one another, or be associated with the event. In this way, a remote user 104, using a viewing device 106, can experience the parade by viewing one or more panoramic views 146 being captured by the video capture devices 102. By associating the video capture devices 102 based on location or event, a user 104 can be offered a choice of various perspectives from which to enjoy the event by choosing between panoramic views 146 captured by cameras 114 of the various video capture devices 102.

Alternatively, each video capture device 102 may be associated with an identifier and may be able to signal or otherwise communicate with nearby video capture devices 102 to allow the video capture devices 102 to associate with one another, and/or to indicate to a user 104 that there may be another alternative vantage point from which to view the environment. As an example, the video capture devices 102 may have an indicator, such as a light, perhaps a colored LED light, which is within a line of sight to other nearby video capture devices 102. In one instance, a user 104 viewing the environment from the perspective of one video capture device 102 may see an indicator from a nearby video capture device 102, which indicates that there is another perspective from which to view the environment. The user 104 may select this nearby video capture device 102 and view the environment from its vantage point.

Additionally, the video capture devices 102 may be able to detect nearby video capture devices 102, such as by detecting an identifier of a nearby video capture device 102. The identifier may be a light, a pattern of pulsed of light, an electromagnetic transmission, a radio frequency transmission, or any other suitable method of identifying nearby video capture devices 102. The video capture devices 102 may thus be able to detect the relative positioning of nearby video capture devices 102 and provide a user 104 an opportunity to select from the various nearby video capture devices 102 from which to view the surrounding environment.

The video capture device 102 may include a microphone unit that comprises one or more microphones 118 to receive audio input. The microphone(s) 118 of the video capture device 102 may detect audio (e.g. audio signals) from the environment, such as sounds uttered by the user 104 and/or other noises within the environment, such as ambient noises (e.g., birds chirping, people talking, children playing, waves crashing, etc.). For instance, the microphone(s) 118 of the video capture device 102 may detect audio commands uttered by the user 104, which may include audible instructions for the video capture device 102 to power on, begin recording video, stop recording video, and so on. The video capture device 102 may also include a speaker unit that includes one or more speakers 126 to output audio sounds. Such audio sounds may be responsive to the audio commands uttered by the user 104, or may provide various types of information to the user 104.

Therefore, the user 104 of the video capture device 102 may interact with the video capture device 102 by speaking to it, and the microphone(s) 118 may capture sound and generate an audio signal that includes the user speech. The codec(s) 212 may encode the user speech and transfer that audio data to other components. The video capture device 102 can communicate back to the user 104 by emitting audible statements through the speaker(s) 126. In this manner, the user 104 may interact with the video capture device 102 simply through speech, without use of a keyboard or display common to other types of devices. Moreover, the user 104 may additionally communicate with a user associated with the video capture device 102.

However, the video capture device 102 may include other user interface (UI) components that enable user interaction with the video capture device 102. For instance, the video capture device 102 may include haptic input devices, such as navigation buttons, keypads, joysticks, keyboards, touch screens, and the like. Furthermore, the video capture device 102 may include a display for text, graphical, or other visual output. The video capture device 102 may also include non-input control mechanisms, such as basic volume control button(s) for increasing/decreasing volume, buttons to cause the cameras 114 of the video capture device 102 to start and stop recording video data 122, buttons to adjust parameters (e.g., resolution, zoom, etc.) associated with the cameras 114, as well as power and reset buttons. There may also be one or more simple light elements (e.g., LEDs around the perimeter of a top portion of the device 106) to indicate a state such as, for example, when power is on or to indicate that the video capture device 102 is currently capturing video of the surrounding environment. Though, in some instances, the video capture device 102 may not use or need to use any input devices or displays in some instances.

The video capture device may include one or more antennas 220 such that it can establish remote communications with the remote computing resources 108 or a viewing device 106. The remote communications may take place over a network (e.g., network 112). The remote communications may implement one or more of various wireless technologies, such as Wi-Fi, Bluetooth, radio frequency (RF), and so on.

In various embodiments, the memory 120 of the video capture device 102 may include the operating system 202. In some instances, the operating system 202 may be configured to manage hardware and services (e.g., device interface(s) 214, global positioning system 218, codec(s) 212, etc.) within, and coupled to, the video capture device 102 for the benefit of other modules.

In addition, the memory 120 may include the video data capture module 204, the video stitching module 206, and/or the camera controller module 208. Also, some or all of the components, modules, hardware, etc., may reside additionally or alternatively at the remote computing resources 108. In various embodiments, the video data capture module 204 may cause the multiple cameras 114 of the video capture device 102 to capture video data 122 of the surrounding environment. That is, assume that the video capture device 102 includes four different cameras 114—a first camera 114, a second camera 114, a third camera 114, and a fourth camera 114. The video data capture module 204, may cause the first camera 114 capture first video data 122, the second camera 114 to capture second video data 122, the third camera 114 to capture third video data 122, and the fourth camera 114 to capture fourth video data 122. As a result, the video capture device 102 may capture four, and possibly more, video streams simultaneously.

Due to the multiple cameras 114 of the video capture device 102 having overlapping fields of view, the video stitching module 206 may stitch together the video data 122 captured by the cameras 114 to generate the stitched video data 128, where the stitched video data 128 corresponds to 360° video. In various embodiments, the video capture device 102 may transmit the raw video data 122 captured by the cameras 114 to the remote computing resources 108, which may then stitch the video data 122. However, a video stitching module residing on the video capture device 102 may first stitch together the video data 122 and then transmit the stitched video data 128 to the remote computing resources 108 for additional processing.

The video stitching module 206 may stitch the individual video streams such that video streams corresponding to a first camera 114 are stitched to video streams corresponding to the two cameras 114 that are adjacent to the first camera 114. Each video stream, or even each frame within the video stream, may have metadata that includes various types of information about the video stream/frame. For instance, the metadata may indicate the specific camera 114 that captured the video stream, the location of the video capture device 102, and the video capture settings of the camera 114. In addition, each frame of the video stream may include a time stamp indicating a time in which the frame was captured. As a result, the video stitching module 206 may stitch together the appropriate video streams (e.g., video streams from cameras 114 adjacent to one another). The video stitching module 206 may also be able to stitch together the appropriate frames of the video streams to one another, such that frames having the same time stamps are stitched to one another.

For the purposes of this discussion, video stitching may correspond to the process of combining multiple video streams having overlapping fields of view to produce a single video stream. The video stitching module 206 may utilize various types of video stitching software and/or video stitching algorithms to stitch the video streams to one another. In various embodiments, the independent video streams may be of varying quality, color, lighting, contrast, etc., and may not require exact overlap in order to be stitched. Upon stitching the video streams to each other, any seams between the video streams of the stitched video (i.e., stitched video data 128) may not be apparent, or at least may be minimal.

One method of reducing the seams between the video streams of the stitched video is by correlating the video capture settings of each camera 114 of the video capture device 102. The camera controller module 208 may be able to detect the optimal exposure settings (i.e., video capture settings) to capture high quality video from each of the cameras 114. It will be appreciated that the cameras 114, each having a different field of view, may require different video capture settings in order to properly expose for the scene depicted within the field of view of each camera 114. The camera controller module 208 can control the video capture settings of the cameras 114 to minimize stark differences in the color, lighting, contrast, etc. of the video data captured by each camera 114.

FIG. 2 further illustrates the video capture device 102 having four different cameras 114—a first camera 114(1), a second camera 114(2), a third camera 114(3), and a fourth camera 114(4). In various embodiments, the four cameras 114 are positioned on the video capture device 102 such that they are 90°, or approximately 90°, from one another. For instance, the first camera 114(1) and the third camera 114(3) may be associated with a first axis that is 90° from a second axis associated with the second camera 114(2) and the fourth camera 114(4). As a result, each of the four cameras 114 captures video in a different direction.

In addition, each of the four cameras 114 has a corresponding field of view 226. The field of view 226 for a particular camera 114 may correspond the portion of the environment surrounding the video capture device 102 that is visible to that camera 114 when the camera 114 is positioned at a particular position and orientation. First objects within the field of view 226 of a camera 114 may be depicted within video captured by that camera 114, while second objects outside of that field of view 226 will not be depicted in that video, although such second objects may be included in the field of view 226 of a different camera 114 of the video capture device 102. Moreover, the field of view 226 of a camera 114 of the video capture device 102 may change in response to movement (e.g., vertical movement, horizontal movement, rotation, etc.) of the video capture device 102.

As shown in FIG. 2, each of the cameras 114 may have a corresponding field of view 226, such that the first camera 114(1) has a first field of view 226(1), the second camera 114(2) has a second field of view 226(2), the third camera 114(3) has a third field of view 226(3), and the fourth camera 114(4) has a fourth field of view 226(4). As shown, the field of views 226 of adjacent cameras 114 of the video capture device 102 may overlap. For instance, the field of view 226(1) of the first camera 114(1) overlaps with the second field of view 226(2) of the second camera, and overlaps with the fourth field of view 226(4) of the fourth camera 114(4). Therefore, certain objects included in the first field of view 126(1) of the first camera 114(1) may also be included in the second field of view 126(2) of the second camera 114(2) or in the fourth field of view 126(4) of the fourth camera 114(4), and vice versa. As a result, the cameras 114 of the video capture device 102 are able to capture video in multiple different directions, which allows the stitched video data 128 to represent a 360° view of the environment surrounding the video capture device 102.

Figure 3:
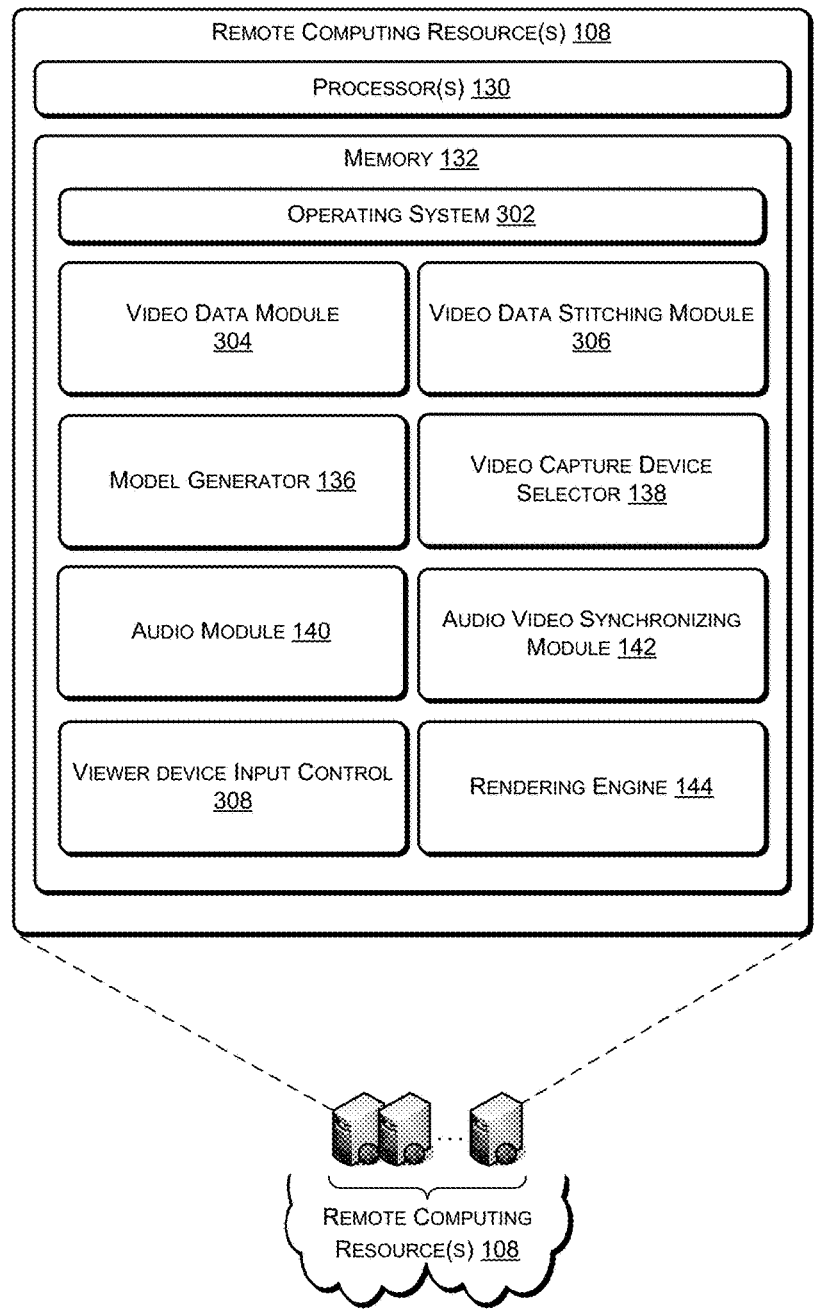
FIG. 3 illustrates one or more example devices that are configured to generate and/or stream panoramic video based on video data captured by multiple cameras of one or more video capture devices.

FIG. 3 shows selected functional components and/or modules of one implementation of the remote computing resources 108 in additional detail. As shown, the remote computing resources 108 may include the processor(s) 130 and memory 132, which may include an operating system 302, a video data module 304, a video data stitching module 306, a model generator 136, a video capture device selector 140, an audio module 140, an audio video synchronizing module 142, a viewer device input control 308, and a rendering engine 144. Moreover, the remote computing resources 108 may generate a panoramic view 146 from video data 122 captured by multiple cameras 114 of the video capture device 102, and from multiple video capture devices 102.

In certain embodiments, the video data module 304 may receive video data 122 captured by the multiple cameras 114 of the video capture device 102. The video data module 304 may receive each of the raw video streams captured by each camera 114. In this scenario, the multiple cameras 114 of the video capture device 102 may capture frames of video, encode the frames of video, and then send, via the network 112, the encoded frames of video to the remote computing resources 108. Alternatively, the video data module 304 may receive the stitched video data 128 from the video capture device 102. That is, at least a portion of the stitching of the video data 122 may be performed by the video capture device 102.

Provided that video capture device 102 provided the video streams to the remote computing resources 108, or only stitched a portion of the video streams, the video data stitching module 306 of the remote computing resources 108 may stitch together the video data 122 captured by the multiple cameras 114 of the video capture device 102 using any suitable stitching algorithm. For instance, the video data stitching module 306 may decode the encoded video streams transmitted by the video capture device 102 and stitch the frames together, thereby generating the stitched video data 128, which may represent 360° video. The remote computing resources 108 may then perform additional processing on the stitched video data 128.

In certain embodiments, the model generator 136 may map the stitched video data 128 onto a three-dimensional shape to create a model to facilitate display of the panoramic view 146 at the viewing device 106. In one example, the model generator 136 creates a cylindrical model of the stitched video data 128. This may be accomplished by any suitable mapping algorithm as is known in the art. In those examples in which a video capture device 102 has four cameras 114 that are spaced approximately evenly with respect to one another, a cylindrical model may be an efficient way of presenting the views captured by the four cameras 114. For example, each camera 114 captures a three-dimensional scene as a two-dimensional rectangular image. The rectangular image has an aspect ratio (i.e., a ratio of its width to its height) that corresponds with the aspect ratio of the imaging sensor of the camera 114.

If we assume that each frame of video data 122 is in the shape of a rectangle and has edges along its sides (i.e., side edges) and along its top and bottom (i.e., top edge and bottom edge, respectively), as the frames from each of the video streams are stitched together at their side edges, the result will initially form a rectangle as the first video stream is stitched to the second video stream. That is, one rectangular frame of video data 122 is stitched along its side edge to a second rectangular frame of video data 122. As a third frame of video data 122 is stitched at its side edge to the second frame of video data 122, the resulting shape is a rectangle having a width that is three times the width of a single frame and having the same height as a single frame of video data 122. However, as a fourth frame of video data 122 is stitched at both of its side edges to the third frame and the first frame of video data 122, the resulting shape is a cylinder with a circumference equal to four times the width of a single frame of video data 122.

However, due to the two-dimensional nature of the initial frames of video data 122, the side edges that are stitched together are likely to show irregularities as the two dimensional images are stitched and mapped to a three dimensional shape. The video data stitching module 306 is configured to remove much of the distortion that is inherent with the mapping process. The result is a 360° panoramic view 146 that is viewable by the viewing device 106.

The mapping process may be accomplished by using any suitable algorithm. In some cases, the mapping is performed by choosing a three-dimensional model, such as a cylinder for example, and modifying the pixel location values from the two-dimensional image space to generate three-dimensional pixel location values. A pixel can be a context subjective term. For example, when referring to an image formed on an LCD screen, a pixel may be a hardware element that illuminates a portion of a screen. On a CRT screen, however, a pixel corresponds to an area of illumination on the screen determined by the timing mechanism and sweep rate of the screen. Pixels may also be present on a printed raster image and constitute the minute dots of color that make up the printed image. As used herein, the term pixel refers to the smallest controllable element of an image. Based upon the context, a pixel may refer to an area of illumination on a display screen.

Oftentimes, a pixel may be represented by a color value and a coordinate location. In a two-dimensional image, a pixel may include a color value and an x-coordinate location and a y-coordinate location that defines its position within the image. However, when mapping a two-dimensional image to a three-dimensional model, the location values of a pixel must be converted to a three-dimensional coordinate system. This is the process of mapping. For example, when mapping a two-dimensional image to a three-dimensional cylindrical model, the pixels that make up the image will be reassigned an x-coordinate location, a y-coordinate location, and a z-coordinate location that will locate the pixel on the model. By assigning pixel location values to the pixels that make up the image, a two-dimensional image may be represented as a three-dimensional model.

In other examples in which the video capture device 102 has more cameras 114, additional types of three-dimensional mapping may be utilized. For example, a video capture device 102 may include eight cameras. Four cameras may be approximately equally spaced about the video capture device 102 and pointing generally horizontally. The video capture device 102 may additionally have four more cameras 114 spaced evenly about the video capture device but tilted upwardly with respect to the first four cameras 114. In this configuration, the resulting stitched video data 128 may effectively map to a hemisphere. That is, the video data 122 represents views around the circumference and above the video capture device 102. As the video streams are stitched together from these eight cameras 114, the model generator may be able to effectively map the stitched video data 128 to a three-dimensional hemisphere.

Accordingly, as a user 104 experiences the panoramic view 146 with the viewing device 106, he/she may be able to look around the scene a full 360° and be able to look upwards as well. Similarly, where the video capture device 102 has cameras around its circumferences pointed generally horizontally, and has a sufficient number of cameras capturing video data 122 above and below the video capture device 102, the model generator 136 may be able to effectively map the stitched video data 128 to a three-dimensional spherical model. As such, a user 104 using the viewing device 106 can view the scene in any direction, including up and down.

The model generator 136 may initially assign a default view for the created panoramic view 146. That is, a default view is assigned to the panoramic view 146 that will initially be displayed on the viewing device 106. The default view may be assigned in any of a number of ways. For instance, the video capture device 102 may have a primary camera 114 that is considered the "front" of the video capture device 102. The primary camera 114 may be indicated on the video capture device 102, may be selected by a user, or may automatically be determined by the video capture device 102 or the remote computing resources 108 based at least partly on the content (e.g., individuals, objects, scenes, etc.) included within the fields of views 126 of the multiple cameras 114.

In one instance, the primary camera, and hence the default view, is assigned based upon one or more algorithms. One such suitable algorithm is an audio localization algorithm. For example, as the video capture device 102 captures audio data through its microphones 118, the audio data may be analyzed by the audio module 140 to determine a point of interest in the panoramic view 146. The point of interest may be someone talking, may be ambient sound, such as the crashing of ocean waves, or may be from multiple sources.

In some instances, the default view can change based upon the audio data. For example, returning to the scene of a birthday party where the video capture device 102 is situated in the center of a table and guests positioned around the table are talking to the guest of honor in turn. As one guest stops talking and another guest begins talking, the default view may change to display the person talking. In this way, the person that is talking is always displayed within the default view and the viewing device 106 will show the person talking without the user 104 having to do anything to change the panoramic view 146. Consequently, without any input from the user 104, the resulting stitched video data 128 can be curated according to cues from the audio data and the panoramic view 146 can change as a result of localized audio sources.

Alternatively, the default view may be fixed, and the viewing device 106 will continue to display the same view unless and until the user 104 moves the viewing device 106 to cause the rendering engine 144 to update the panoramic view 146 displayed at the viewing device 106. For example, as the user 104 rotates the viewing device 106, the panoramic view 146 may be updated to display whatever or whomever the user 104 desires to look.

The video capture device 102 has a unique coordinate system based upon the orientation of the video capture device 102, which may be referred to as the camera space. As used herein, the term camera space refers to a coordinate system specific to the video capture device 102 and may include a direction based upon its orientation relative to a compass, or may be based upon a primary camera and a default view. Additionally, the model created by the model generator 136 has its own coordinate system, which will be referred to as the world space. The world space may align with the camera space or may initially align with the camera space but is not tied to the camera space. Finally, the viewing device 106 has its own coordinate system, which will be referred to as the user space.

In some embodiments, the model generator 136 translates the stitched video data 128 from the camera space to the world space. In short, what the video capture device 102 defines as the default view may or may not be what the model generator 136 defines as the default view of the panoramic view 146. Where the video capture device 102 has a primary camera 114 defined, the field of view 226 of the primary camera 114 may be the default view according to the camera space. However, the model generator 136 may define a different field of view as the default view based on any of a number of factors, such as audio data, for example. The model generator 136 thus determines its own default view within the world space and will relate the world space to the camera space. Finally, the user space is relative based on the sensors 148 within the viewing device 106. When the viewing device 106 is displaying the panoramic view 146 in real time, the user space is mapped to the camera space so that the panoramic view 146 the user 104 desires to see is the field of view 226 the video capture device 102 is optimizing and/or the view that the rendering engine 144 is rendering and providing to the viewing device 106. Where the user 104 is playing back a pre-recorded panoramic view 146, the user space is mapped to the world space so that the panoramic view 146 the user 104 desires to see is the view the rendering engine 144 is rending and providing to the viewing device 106. The rendering engine 144 could also be located within the viewing device 106 and the panoramic view 146 may be rendered at the viewing device 106.

The audio module 140 may take the panoramic view 146 into account and increase the gain of the audio data associated with the panoramic view 146. For instance, when a user 104 desires to view one person seated around the table when multiple people are talking simultaneously, the audio module 140 may increase the volume of the person within the panoramic view 146 and may additionally lower the volume of audio sources not displayed within the panoramic view 146. This can be accomplished by, for example, calculating which microphone(s) 118 are closest to the sound source by analyzing the audio delay as the audio is captured by each microphone 118 and boosting the gain on the microphone(s) 118 that are closest to the sound source while using the remaining microphone(s) 118 to cancel, or at least reduce the gain of, unwanted audio data.

The audio module 140 may optionally cooperate with the model generator 136 to associate the audio data with the model. For example, where the model generator 136 creates a cylindrical model, the audio module 140 may be configured to orient the directionality of the audio data to correspond with the stitched video data 128. More specifically, the spatial orientation of the video data 122 and localization of the audio data can be aligned such that when a user 104 is viewing a panoramic view 146 and a sound occurs outside the panoramic view 146 on the right side, the audio data is localized such that it sounds like it is emanating from the right side. The audio localization can be performed in any suitable way.

Typically a sound field is created through a series of audio channels spaced throughout a listening environment. That is, multiple speakers can be positioned throughout a listening area and the sound field can be controlled and/or modified such as by sending audio signals through the various audio channels to create the sense of three-dimensional localized sound. In some embodiments where two-channel audio is available, such as situations where headphones are used by a user 104, the audio module 140 can control the sound field by panning the audio data between the left channel and the right channel.

In instances in which multiple video capture devices 102 are disposed within an environment, a video capture device selector 138 (VCD selector) enables a user 104 to change the perspective of the panoramic view 146 by switching to stitched video data 128 captured by different video capture devices 102. As described above, the video capture devices 102 may have location services associated therewith, such as a global positioning system 218, which provides location data to the remote computing resources 108. The video capture devices 102 can therefore be associated with a location or with an event.

For example, one or more video capture devices 102 could be located within a sporting venue, such as a football stadium. Individual video capture devices 102 could be located throughout the stadium to provide various perspectives and views from advantageous locations within the stadium. As examples, video capture devices 102 could be mounted to, or adjacent to, a computer-controlled, stabilized, cable-suspended camera system that captures video data 122 while suspended from above the field of play. Additional video capture devices 102 could be mounted to referees, coaches, aircraft such as a blimp, or individual players. Additional video capture devices 102 could be located to show a real-time status of lines at food vendors or at restrooms.

The VCD selector 138 allows the panoramic view 146 to switch between the perspectives of the various video capture devices 102. In some embodiments, a listing of available perspectives can be communicated to a user 104, who selects an available perspective through any suitable input device, such as a haptic input device connected to the viewing device 106. Alternatively, a user 104 can select an available perspective through voice commands or gesture commands. In some instances, the perspective jumps from one video capture device 102 to another upon selection. In other instances, a three-dimensional model of the environment is created by the model generator 136 and the transition from one perspective to another can be made smoothly.

In instances where multiple video capture devices 102 are disposed around a target environment, the model generator 136 may generate a three-dimensional model of the entire environment, which may allow a user 104 to navigate through the virtual environment in three-dimensions. For example, by having video capture devices 102 strategically positioned, the model generator 136 can use the various video data 122 to recreate virtual three-dimensional representations of the objects contained within the environment. Thus, during real-time streaming of the panoramic view 146, or pre-recording and subsequent playback of the stitched video data 128, a user 104 can explore the environment in three dimensions. As stated above, the viewing device 106 may be configured with motion sensors 148, such as gyroscope, accelerometers, and/or compasses to detect motion and/or orientation of the viewing device 106. Actual movement of the viewing device 106 can result in virtual motion through the three-dimension virtual environment.

For example, using the viewing device 106, a user can walk around objects and see them from various angles. Either during playback of a previously recorded event, or while viewing the event in real time, a user 104 can walk through a three-dimensional virtual environment, pause the playback or streaming of the panoramic view 146, and inspect objects in three dimensions before resuming the playback or live streaming.

An audio video synchronizing module 142 is configured to synchronize the audio and video so that the audio data matches the video data 122. In other words, when the user 104 sees something happen and expects an associated noise with the event, the noise will be heard on time with what the user 104 sees. The audio video synchronization 142 can be performed at the time the video capture device 102 captures video data 122 such as by starting and stopping the capture of audio data and video data 122 simultaneously. Alternatively, the audio data and the video data 122 can have timestamps associated therewith that are matched up later during a stitching process, during model creation, or at rendering.

The remote computing resources may further have a viewer device input control 308 that receives a control input from the viewing device 106. As discussed, the viewing device 106 has one or more location, position, orientation, and/or motion sensors 148 that can provide control signals to the viewer device input control 308. For instance, as the viewing device rotates to the left, the panoramic view 146 will likewise rotate to the left a corresponding amount. Similarly, as the viewing device 106 tilts upward, the panoramic view 146 tilts upward a corresponding amount. In this way, the motion of the viewing device 106 controls what is displayed in the panoramic view 146.

In those instances in which the model generator 136 creates a spherical model, the viewing device 106 can be moved to any orientation and the panoramic view 146 will be updated to reflect the view associated with the direction and orientation of the viewing device 106. This is made possible in part by the rendering engine 144 that is configured to render the stitched video data 128 that corresponds to the panoramic view 146 the user 104 desires to view.

The rendering engine 144, based in part on the viewer device input control 308 information, will render a portion of the stitched video data 128 that corresponds to the panoramic view 146 of the model that the user 104 wishes to view. The rendering engine 144 is configured to render the portion of the stitched video data 128 that corresponds to the panoramic view 146. It further may encode the panoramic view 146 and deliver it to the viewing device 106 for decoding and display.

In some cases, the rendering engine 144 only renders a portion of the stitched video data 128 that corresponds with a desired panoramic view 146. This may be due, in part, to the computationally intensive process require to fully render 360° video. The rendering engine 144 may render the desired panoramic view 146 plus a buffer that extends beyond the boundary of the panoramic view 146 to allow for a quick and smooth transition to a new panoramic view 146 in response to motion of the viewing device 106.

The panoramic view 146 the user desires to see may be different than the default view according to either the camera space or the world space. For instance, where a video capture device 102 is rotating, the viewing device 106 may remain stationary. In this instance, the panoramic view 146 being displayed at the viewing device 106 may maintain a constant field of view.

Figure 4:
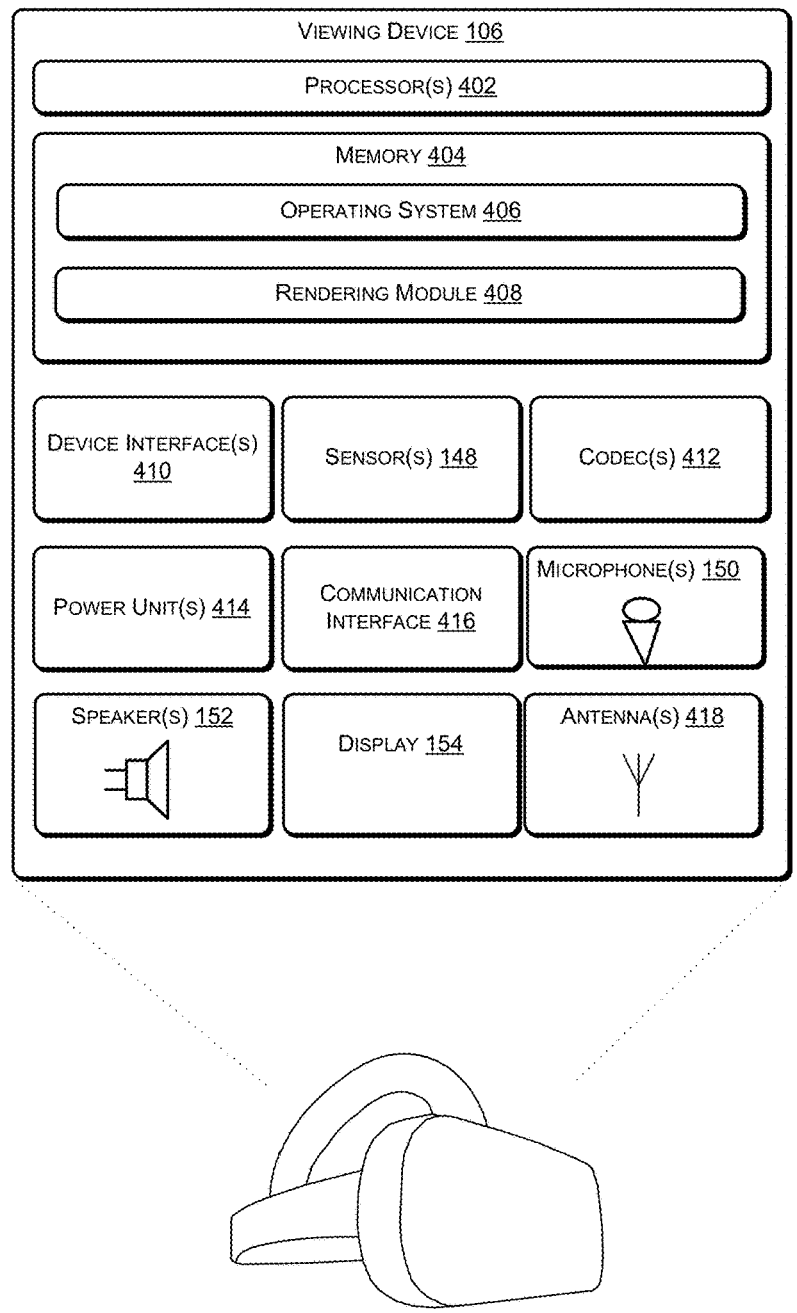
FIG. 4 illustrates an example device that is configured to receive audio and panoramic video captured by a remotely located video capture device in order to provide an immersive virtual reality experience.

FIG. 4 shows selected functional components and/or modules of one implementation of a viewing device 106 that may be used with the systems and/or processed described herein. As shown, the viewing device 106 may have one or more processors 402, memory 404, and various hardware and/or software components or modules.

Generally, the viewing device 106 may be implemented as a standalone device that may be relatively simple or complex in terms of functional capabilities with input/output components, memory, and processing capabilities. For instance, the viewing device 106 may or may not have a keyboard, keypad, or other form of mechanical input in some implementations. The viewing device 106 may or may not have a display or touch screen to facilitate visual presentation and user touch input. Moreover, the viewing device 106 may be implemented with the ability to receive and output audio, video, and/or visual data, a network interface (wireless or wire-based), power, and processing/memory capabilities. As set forth above with respect to FIG. 1*a*, the viewing device 106 may include sensors 148 that can detect the position, location, orientation, and/or motion of the viewing device, a microphone 150, speakers(s) 152, and a display 154.

In the illustrated implementation, the viewing device 106 may include processor(s) 402 and memory 404. In various embodiments, the processor(s) 402 may execute one or more modules and/or processes to cause the viewing device 106 to perform a variety of functions, as set forth above and explained in further detail herein below. In some embodiments, the processor(s) 402 may include a central processing unit (CPU), a graphics processing unit (GPU), both CPU and GPU, or other processing units or components known in the art. Additionally, each of the processor(s) 402 may possess its own local memory, which also may store program modules, program data, and/or one or more operating systems. The processor 402 may include multiple processors 402 and/or a single processor 402 having multiple cores.

The memory 404 may include computer-readable storage media ("CRSM"), which may be any available physical media accessible by the processor(s) 402 to execute instructions stored on the memory 404. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by the processor(s) 402. As will be discussed in additional detail, the memory 404 may include an operating system 406, one or more modules, such as a rendering module 408.

The viewing device 106 may further include one or more device interfaces 410 (e.g., USB, broadband connection, etc.) to facilitate a wired connection to a network, such as network 112, or a plug-in network device that communicates with other wireless networks. Moreover, one or more power units 414 may further be provided to distribute power to the various components of the viewing device 106. The power unit(s) 414 may include hardware that enables the viewing device 106 to be plugged into an outlet, thereby providing power to the video capture device 106. Alternatively, or in addition, the power unit(s) 414 may correspond to one or more batteries (rechargeable or not) that may provide power to the viewing device 106. Provided that the video capture device 102 includes one or more batteries, the viewing device 106 may be carried and used by the user 104 while he/she positions the viewing device 106 in different orientations or moves between different locations.

The viewing device 106 may include one or more sensors 148 as described above for detecting the motion, position, orientation, or location of the viewing device 106. One or more codecs 412 are provided to allow the panoramic view 146 to be decoded and displayed at the viewing device 106. A communication interface 416 may be wired or wireless and allows the viewing device 106 to communicate with other device and receive the panoramic view 146, such as by using antenna(s) 418 and communicating through a network 112.

One or more microphones 150 may be provided to facilitate the receipt of voice commands or communication between the user 104 and the video capture device 102. One or more speakers 152 are provided to allow the user 104 to hear the audio associated with the panoramic view 146.

While the illustrated viewing device 106 is a virtual reality headset that is designed to be worn by the user 104 as he/she interacts with the panoramic view 146, any sort of display device can be used as part of the system and/or processed described herein. For example, additional suitable viewing devices 106 include smart phones, tablets, televisions, desktop or laptop computers, or projectors. While many portable handheld computing devices will have many of the illustrated components built in, such as the sensors 148, microphones 150 and speakers 152, some of the devices may not have all the illustrated components. For example, it may not be feasible for a television to incorporate sensors 148 to track the motion of the television in order to modify the panoramic view 146 to display a different field of view of the stitched video data 128.

In such cases, a remote control may be used which can have buttons or a touch display that will provide the input necessary to navigate the virtual environment. Moreover, such devices may accept voice control and/or gesture control to navigate the virtual environment. For example, a user 104 can press directional arrows on a remote control or may use gestures or natural language to indicate a desire to pan right or left in the panoramic view 146 or to change perspectives such as by viewing a panoramic view 146 from a different video capture device 102.

In some embodiments, the viewing device 106 incorporates a rendering module 408 that is capable of rendering the panoramic view 146 either in real time/near real time or after the video data 122 is captured by the multiple cameras 114 of the video capture device(s) 102. Moreover, the rendering module 408 may perform a portion of the rendering while the remote computing resources 108 may provide another portion of the rendering. Moreover, the viewing device 106 may be connected to a computing device, such as a personal computer, laptop, tablet, or other device that can also share in the rendering and/or decoding duties necessary to provide a smooth panoramic view 146. In the situations in which the viewing device 106 is tethered to another computing device, power may be provided through a cable that connects the viewing device to another computing device. Additionally, the communication interface 416 may utilize a wired broadband internet connection of the additional computing device rather than rely on a wireless connection for receiving the panoramic view 146.

Figure 5:
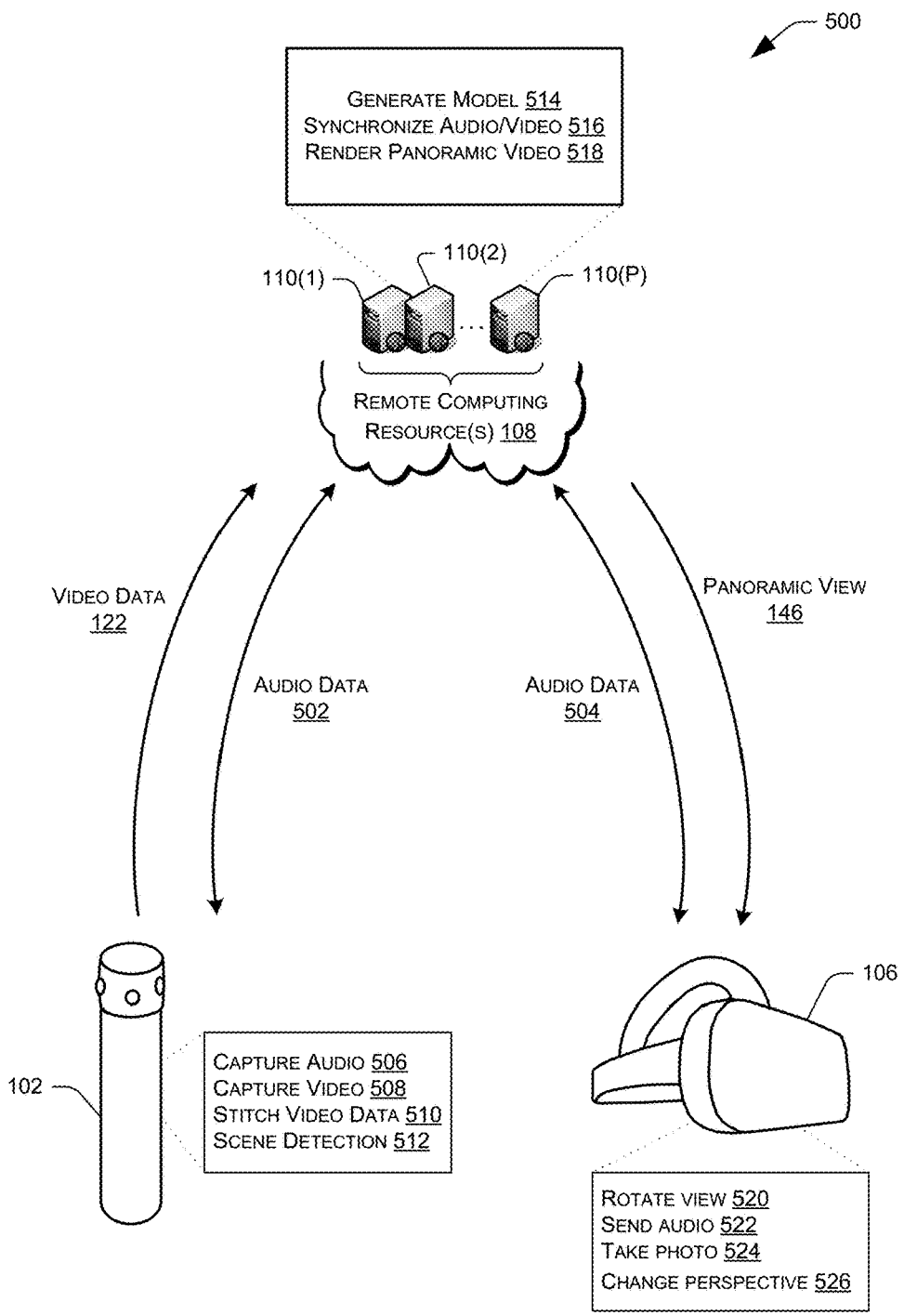
FIG. 5 illustrates an example system that provides audio and panoramic video from a video capture device having multiple cameras to a viewing device for an immersive viewing experience.

FIG. 5 illustrates an example system 500 that provides functionality to generate an immersive virtual reality experience in real time using a video capture device 102 that captures and sends video data 122 and audio data 502 to a remote computing resource 108. The remote computing resource 108 generates a model based upon the video data 122, synchronizes the audio data 502 and the video data 122 and then renders a panoramic view 146 including audio data 504 that is synchronized with the panoramic view 146. A viewing device 106 is configured to receive the panoramic view 146 and audio data 504 and display the panoramic view 146 for a user 104.

As described herein, a video capture device 102 includes a plurality of cameras 114 configured to capture up to a 360° view of the environment surrounding the video capture device 102. The video capture device 102 includes the necessary components in hardware and software to enable it to capture audio 506, capture video 508, optionally stitch video data 510, and optionally perform scene detection 512.

The video capture device 102 may capture audio 506 and synchronize it as it captures video 508. Alternatively, the audio/video synchronization may be performed at the remote computing resources 108. In some instances, the video capture device 102 may stitch video data 510 to create stitched video data 128, or may provide video data 122 to the remote computing resources 108 for stitching and further processing.

Finally, the video capture device 102 may execute one or more algorithms, such as a scene detection 512 algorithm that may detect the scene (e.g., an indoor setting, a beach, etc.) surrounding the video capture device 102 and may use this information in setting the video capture settings of the cameras 114 to provide for correct exposure, lighting, contrast, white balance, among other settings. The function of scene detection 512 may also be used to provide one or more color correction templates to the video data 122 to execute a global color correction change to the video data 122.

The remote computing resources 108 are configured to process the video data 122 and audio data 502 to provide a panoramic view 146 to a viewing device 106 that allows for an immersive experience for the user 104. The remote computing resources 108 generate a model 514 based upon the video data 122 and the configuration of the video capture device 102. For example, in embodiments in which the video capture device 102 incorporates four cameras 112 equally spaced around the circumference of the video capture device and are coplanar, the remote computing resources 108 may generate a cylindrical model in which the video data 122 is stitched and the audio data 502 is correlated with the cylindrical model to allow for audio localization based upon the view in the viewing device 106.

The remote computing resources 108 may also be responsible for synchronizing audio/video 516 to ensure the audio data 502 and video data 122 are synchronized before sending the panoramic view 146 to the viewing device 106. The remote computing resources 108 additional may be configured to render the panoramic video 518. That is, the remote computing resources may assemble the video and prepare it to be viewed at the viewing device 106, such as by formatting the data for viewing at the viewing device 106. This may entail decoding the video data 122 and audio data 502 captured by the video capture device 102, performing the necessary processing and synchronizing, and encoding the panoramic view 146 and audio data 504 in preparation for viewing at the viewing device 106.

The rendering may be done in real time as the video data 122 and audio data 502 are being captured by the video capture device. Alternatively, the video data 122 and audio data 502 may be saved for later playback, in which case the entire 360° video may be rendered and stored for playback, or rendering may wait until a user wishes to playback the panoramic view 146, at which time the rendering may commence.

Since the viewing device 106 is only capable of viewing a predetermined portion of the 360° video data, only a portion of the 360° may be rendered for playback at the viewing device 106. In some embodiments, the viewing device 106 is configured with motion sensors 148 that send information to the remote computing resources 108 indicating that the user wishes to change the field of view of the panoramic view 146. For example, in the case where a user 104 is wearing a virtual reality headset, the user may turn his/her head to the side to view a different part of the stitched video data 128 than what is currently being displayed. In response, the remote computing resources 108 may render a different portion of the stitched video data 128 to provide the panoramic view 146 the user 104 is desiring to view. Concomitantly, the audio data 504 may be panned more toward one or more audio channels to enhance the immersive experience by localizing the sound to correlate where the audio source is located within the panoramic view 146.

As discussed above, the rendering may happen at the remote computing resource 108, at the display device 106, or a combination of each. Moreover, the viewing device 106 may be associated with an external processor, such as when it is tethered to a desktop computer or some other computing device, and the external processor may assist with rendering the panoramic view 146 or may take sole responsibility for rending the panoramic view 146.

The viewing device 106 may be able to send audio 522 to the remote computing resources 108 and/or to the video capture device 102. Such audio 522 may include voice commands indicating that the user 104 wishes to change perspectives, zoom in, start/stop recording, or other such voice commands. In addition, the user may send audio 522 in the form of audio data 504 to a user associated with the video capture device 102. In this way, the user 104 may communicate with a user proximate to the video capture device 102.

Additionally, a user proximate the video capture device 102 may likewise communicate with the user 104 by talking into the microphone 118 of the video capture device 102. The user 104 may be able to see the environment surrounding the video capture device 102 and will be experience a video call since video data 122 and audio data 502 will be provided by the video capture device 102 to the viewing device 106.

The viewing device 106 may further indicate to the remote computing resources 108 that the user 104 wishes to take a panoramic photo of the scene being displayed in the viewing device 106. The photo can be saved or delivered to the user 104 or to another person through any suitable method, such as email, text message, saving on a server, or uploaded to a social media site, for example.

The viewing device 106 may also indicate to the remote computing resources 108 that the user wishes to change perspective 526 of the panoramic view 146. This indication may be provided in a number of ways. For example, the user may rotate or otherwise move the viewing device, which when configured with motion sensors, will send motion data to the remote computing resources 108 indicating that a user 104 wishes to rotate the view 520, which will cause the remote computing resources 108 to render a different portion of the panoramic view 146 for viewing at the viewing device 106. Alternatively, the user may provide a voice command to change the perspective, or may provide some indication through another suitable method, such as, for example, a remote control unit, through a touch screen, or through gesture control. A user 104 may also instruct the remote computing resources 108 or the video capture device 102 to capture and save a photo 524 of the environment. The instruction may be given as described above, such as by issuing a voice command, through a remote control, touchscreen, gesture control, or an interface on the viewing device 106.

The user 104 may also indicate a desire to change perspective 526 by viewing a panoramic view 146 from a different video capture device 102. In some instances, multiple video capture devices 102 may be disposed throughout a location and the user 104 can have the option of selecting any of the video capture devices 102 in the vicinity. In some implementations, a default view for the video data 122 is determined based upon the viewing device 106. For instance, where a user 104 is looking at an object depicted in the panoramic view 146, when the user changes perspective by viewing a panoramic view 146 from a second, different video capture device 102, the default view of the second video capture device 102 is oriented to continue displaying the object.

As an example, where a user 104 is experiencing a live concert, when the user 104 desires to view a panoramic view 146 in the direction of the stage, the panoramic view 146 will continue to show the stage even when switching perspectives by viewing video data 122 captured by a different video capture device 102. In this way, the default view can be controlled by the viewing device 106 and can be based upon object detection.

Alternatively, the default view can be controlled directionally by the viewing device 106. For instance, the viewing device 106 may be outfitted with a compass that can sense the direction the viewing device is facing 106. The compass direction of the viewing device 106 can be correlated with the compass direction in the virtual environment. For example, if a user 104 has rotated the viewing device 106 to face east, then the panoramic view 146 will reflect a field of view that is to the east of the video capture device.

In another example, a video capture device 102 may be mounted to an aircraft, such as an airplane or a hang glider. Based upon the motion of the video capture device 102, the default view may be in the direction of travel and the user 104 will initially view a panoramic view 146 that is forward of the aircraft. When the panoramic view 146 is controlled by the viewing device 106, even if the aircraft banks or turns, the panoramic view 146 will remain constant and will not change to follow the changing direction of the aircraft. The position and/or orientation of the viewing device 106 can be used to determine the panoramic view 146 that is displayed, and as long as the viewing device 106 remains relatively stationary, the panoramic view 146 will likewise remain relatively stationary independent of how the video capture device 102 may be moving.

Figure 6:
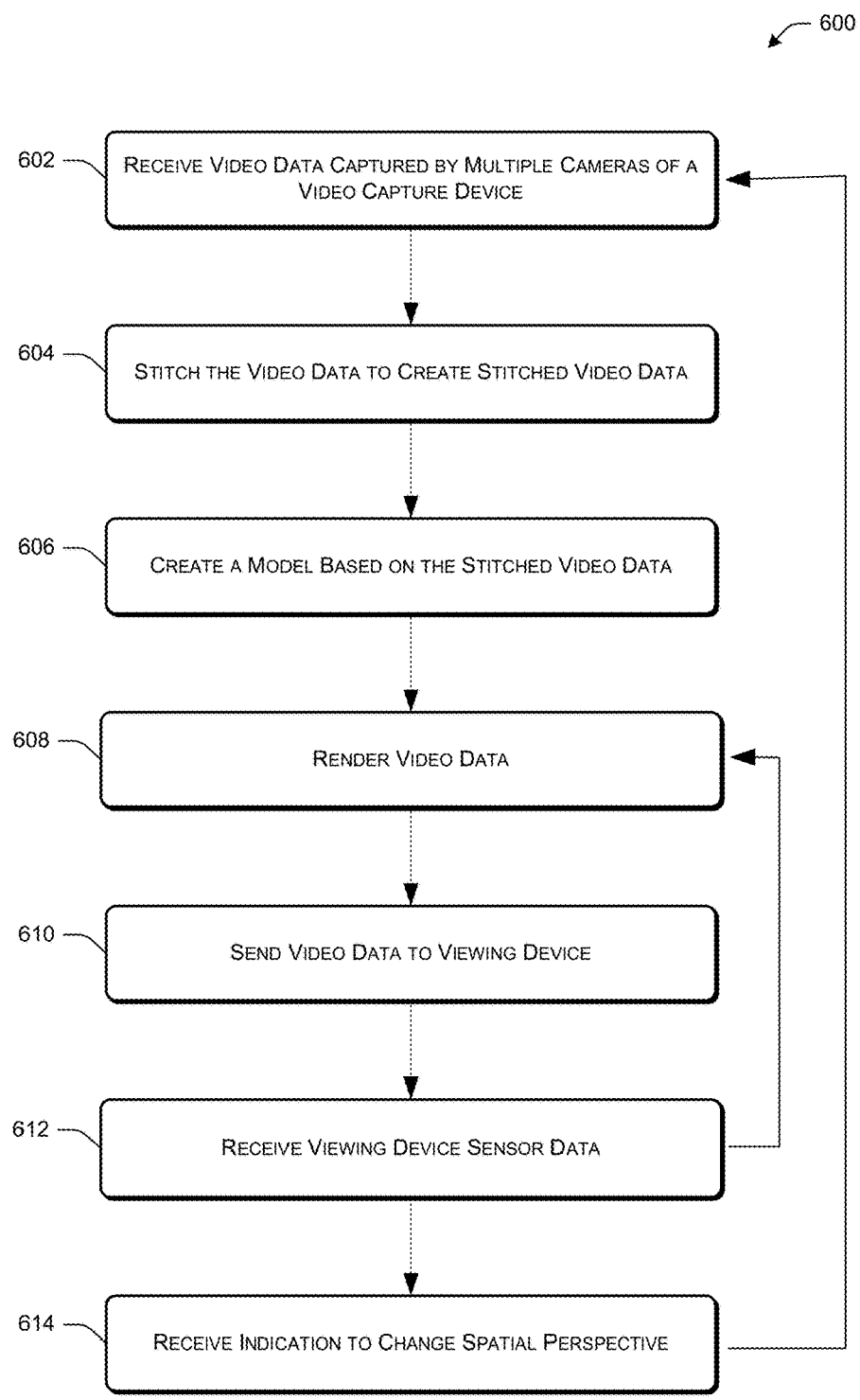
FIG. 6 is a flow diagram illustrating an example process of creating and streaming an immersive panoramic video to a viewing device.
Figure 7:
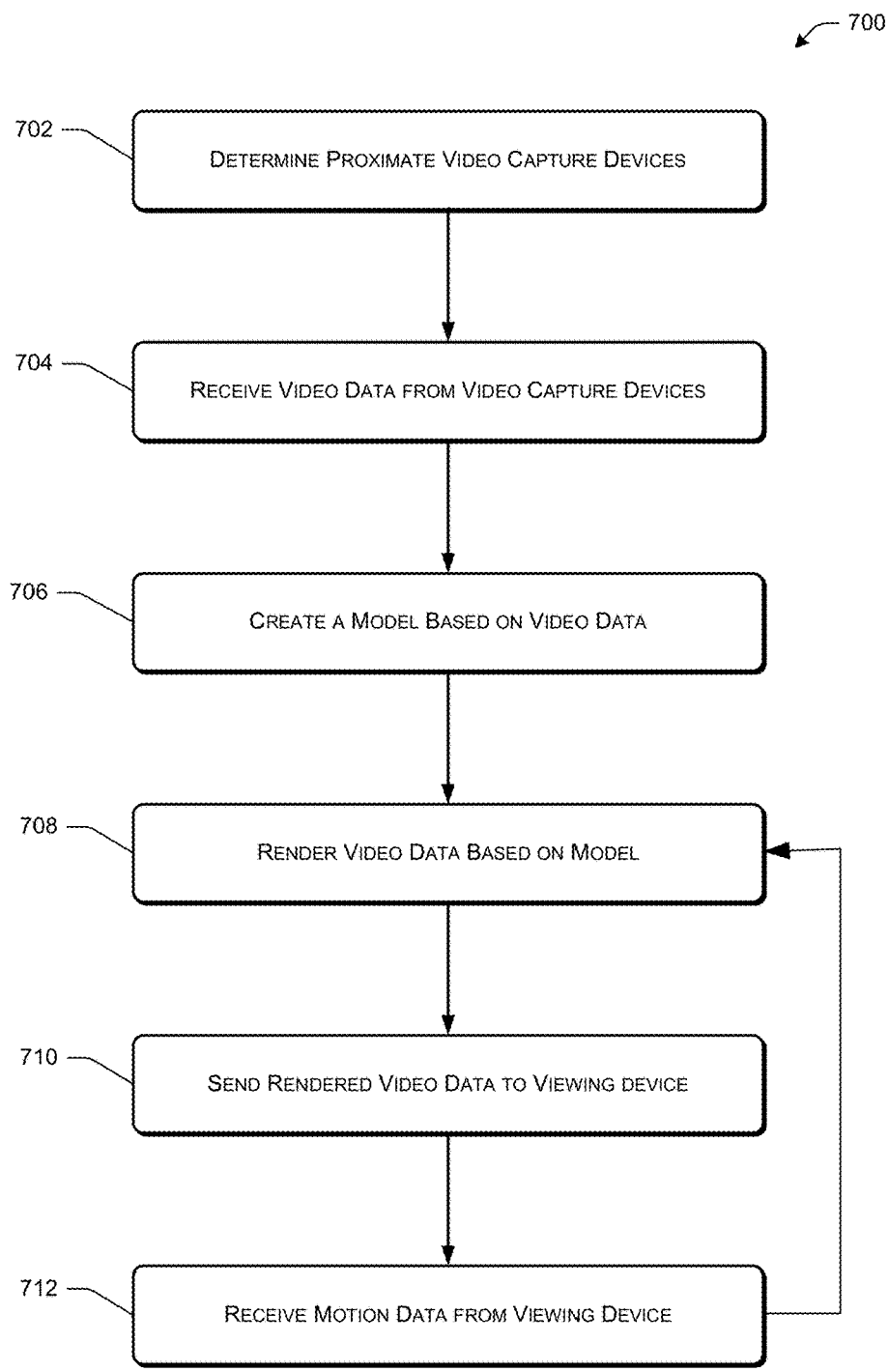
FIG. 7 is a flow diagram illustrating an example process of creating and providing a three-dimensional virtual environment from a plurality of video capture devices having multiple cameras.

FIGS. 6 and 7 are flow diagrams of illustrative processes for creating a remote immersive user experience by generating a panoramic view 146 based on video data 122 captured by multiple cameras 114 of one or more video capture devices 102. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 6 is a flow diagram illustrating an example process 600 of generating a panoramic view 146 based at least partly on a model generated to map the video data 122 captured by multiple cameras 114 of a video capture device 102. Moreover, while the following actions described with respect to FIG. 6 are illustrated to be performed by the remote computing resources 108, the actions described with respect of FIG. 6 may be performed by the video capture device 102, the remote computing resource(s) 108, and/or the viewing device 106, or any combination of the same, as illustrated in, and described with respect to, FIGS. 1-5.

Block 602 illustrates receiving video data 122 captured by multiple cameras 114 of a video capture device 102. In various embodiments, multiple cameras 114 of the video capture device 102 may each capture a video stream within a corresponding field of view 226. For instance, four different cameras 114 that are positioned approximately 90° from one another may simultaneously capture video data 122. In some embodiments, the video capture device 102 may transmit the raw video streams to the remote computing resources 108 for stitching. In other embodiments, the video capture device 102 may include one or more modules 124 that apply/run/execute video stitching algorithms to stitch together the video streams, thereby creating a 360° video (i.e., the stitched video data 128). The stitched video data 128 may then be sent to the remote computing resources 108.

Block 604 illustrates stitching the video data 122 to create stitched video data. The stitched video data 128 is created by stitching the video streams captured by each camera 114 in a video capture device 102 into one stream of stitched video data 128.

Block 606 illustrates created a model based on the stitched video data. In an embodiment unitizing four cameras 114 in a video capture device 102, a cylindrical model may be generated and the video data 122 can be projected onto the cylindrical model. Moreover, where a video capture device 102 includes additional cameras positioned about the video capture device, a hemispherical or a spherical model may be generated and the video data 122 can likewise be projected to create these models.

Block 608 illustrates rendering the video data 122. A default view is determined based upon the indicated "front" of the video capture device 102, the orientation of the viewing device 106, or based upon audio cues that allow for video curation. As used herein, video curation is the process of determining what to display on the viewing device 106. When capturing the audio data 502 through multiple microphones and analyzing the difference in time the audio data 502 reaches each microphone, the audio module 140 can determine the direction of the sound source. Accordingly, the default view may be established by displaying the source of the audio within the panoramic view 146.

In many cases, the entire 360° stitched vide may not be viewable at one time on the viewing device 106. Accordingly, a portion of the 360° stitched video may initially be rendered that corresponds to the default view. Moreover, the rendered portion of the 360° stitched video 128 may also correlate to the aspect ratio of the display device. For example, where each camera 114 of a video capture device 102 captures video at an aspect ratio of 16:9, if the viewing device also has an aspect ratio of 16:9, then in order to fill the screen, the panoramic view 146 will comprise a field of view corresponding to one camera 114 of the video capture device 102. In order to display a wider angle of the panoramic view 146, the screen should have a larger aspect ratio, such as 32:9, in which case the panoramic view 146 could comprise the field of view captured by two cameras 114 of the video capture device. In order to display the entire 360° stitched video data 128 on the viewing device 106, the screen should have an aspect ratio equal to the four streams of video data stitched together, or 64:9 in this example.

Accordingly, unless the viewing device 106 is capable of displaying the entire 360° stitched video, then only a portion of the 360° stitched video needs to be rendered at a time. In some cases, the panoramic view 146 is rendered such that it fills the screen of the viewing device 106 plus a buffer that is not displayable on the viewing device 106. The buffer provides extra rendered video in case the viewing device 106 suddenly moves, in which case there may not be any noticeable lag since the video data 122 will have already been rendered. As described above, the rendering can be performed by the remote computing resources 108, by the viewing device 106, or both.

At block 610, the video data 122 is sent to the viewing device 106 as a panoramic view 146. The video data 122 may be captured, stored, and played back on a viewing device 106 at any later time. Alternatively, the video data 122 may be streamed to the viewing device 106 in real time, or near real time.

Block 612 illustrates receiving sensor data of the viewing device 106. As discussed, the viewing device 106 may have one or more sensors 148 configured to communicate the position, orientation, location, elevation, or other information that is detectable by sensors to the remote computing resources 108. The initial orientation of the viewing device 106 may be used to determine the default view as the video data 122 is rendered. Moreover, the motion data associated with movement of the viewing device 106 can be used to pan across the video data 122 to present a different panoramic view 146. For example, when the viewing device 106 rotates forty-five degrees clockwise, the panoramic view 146 likewise rotates forty-five degrees clockwise and this new panoramic view 146 is rendered and displayed. In some instances, the panoramic view 146 is rendered as the view rotates so the change in orientation of the viewing device 106 results in a smooth rotation of the panoramic view 146.

From block 612, as the viewing device 106 continues to move, the video data is rendered at block 608 and the resulting video data, such as the panoramic view 146, is sent to the viewing device 106 at block 610.

Block 614 illustrates receiving an indication to change the spatial perspective of the panoramic view 146. The indication may be provided by an audio signal, a haptic input device, a touch screen, a gesture, a remote control unit, or other method of indicating a desire to change the spatial perspective of the panoramic view 146 displayed on the viewing device 106.

Upon receipt of an indication to change the spatial perspective, the remote computing resources 108 will receive the video data 122 from a different video capture device 102 at block 602 and continue through the illustrated process of stitching the video data, if necessary, rendering the video data, and sending the video data to the viewing device. The initial frame of reference, or the default view, may be based upon features recognized in both panoramic views 146, the orientation of the viewing device 106, the orientation of the video capture devices 102, or upon some other determination.

FIG. 7 illustrates is a flow diagram illustrating receiving video data from multiple video capture devices 102 located proximate to each other, creating a model from the video data 122 and creating a remote immersive user experience. It should be understood that the process illustrated in FIG. 7 may take place on the video capture device 102, at the computing resources 108, on the viewing device 106, or through any combination of the devices described in reference to FIGS. 1-5.

At block 702, video capture devices 102 that are proximate to one another, such as video capture devices 102 that are located within the vicinity of a common event, are determined and associated with one another as optional perspectives for a viewing device 106 to receive video data 122 from.

Block 704 illustrates receiving video data 122 from video capture devices 102. The video data 122 from the video capture devices 102 may be received only when a video capture device 102 is called upon to provide its video data 122 in response to a request from a viewing device 106 to access the perspective afforded by the video capture device 102. Alternatively, the video capture devices 102 can send their respective video data 122 to the remote computing resources 108 in order to create models and to be prepared to send the video data 122 to the viewing device 106.

Block 706 illustrates creating a model based on the video data 102. Depending on the configuration and layout of the video capture device 102, the video data 122 may be mapped to a cylindrical model, a hemispherical model, or a spherical model. This is done by projecting the video data 122 onto a three-dimensional shape using appropriate algorithms, many of which are available and suitable. Additionally, the video data 122 from the various video capture devices 102 can be combined and used to reconstruct a three-dimensional model of the environment surrounding the video capture devices 102.

Block 708 illustrates that the model is used to render video data 122 into a panoramic view 146. A default view is initially presented in the panoramic view 146, and may be determined by orientation or motion of the video capture device, video curation based on audio cues, or initial orientation of the viewing device 106. In any event, in some cases, the viewing device 106 controls the panoramic view 146 that is displayed, such that even though the video capture device may be moving and rotating, the panoramic view 146 remains constant unless and until the user 104 desires to change the panoramic view 146 such as by changing the orientation of the viewing device 106.

Block 710 illustrates sending the rendered video data to the viewing device 106. The viewing device 106 itself may have enough computational resources to render some of the video data 122 and so this step does not exclude rendering at least a portion of the video data at the viewing device 106.

Block 712 illustrates receiving motion data from the viewing device 106. The motion may include translational motion such as moving forward, backward, left, right, up or down, as well as rotational motion such as tilting up or down, and pivoting left or right. In some instances, the motion of the viewing device 106 will control what is displayed at the viewing device 106. For example, where the model includes a hemispherical or spherical projection of the video data 122, as the viewing device 106 is pointed downward, the panoramic view 146 may display the ground below the user 104. Likewise, as the viewing device 106 is rotated 180°, the panoramic view 146 will also rotate 180° to display video data 122 from the opposite direction as initially shown.

The motion data from the viewing device 106 is used to determine which portion of the video data 122 gets rendered and the process returns to block 708. Where the model is a three-dimensional recreation of the environment surrounding multiple video capture devices 102, a translational motion of the viewing device 106 may result in a translational movement through the virtual three-dimensional space. Similarly, a three-dimensional model may allow a user 104 to explore the environment in three dimensions. Additionally, if desired, a user can pause the real time panoramic view 146, or in the case of a pre-recorded video, the user can pause the playback, and explore the environment in three dimensions, including walking around objects by physically moving their feet to move throughout the three-dimensional virtual space.

The process and/or systems described herein provide for a remote immersive user experience by allowing a remote user to interact with an environment by accessing stitched video data captured from one or more video capture devices 102 having multiple cameras 114. The remote user can control what is displayed in the viewing device 106 as a result of movement of the viewing device 106.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
   memory;
   one or more processors; and
   one or more computer-executable instructions stored in the memory and executable by the one or more processors to perform operations comprising:
   receiving, from a first video capture device, first stitched video data, the first stitched video data being generated by a video stitching algorithm that stitches together:
   first video data captured by a first camera of the first video capture device, and
   second video data captured by a second camera of the first video capture device;
   generating a first three-dimensional model by assigning a first three-dimensional coordinate location to a first set of pixels in the first stitched video data;
   generating a first series of video frames from the first three-dimensional model representing a first view of a scene depicted in the first stitched video data;
   sending the first series of video frames formatted to be displayed by a virtual reality viewing device;
   receiving motion data generated by a gyroscope associated with the virtual reality viewing device, the motion data indicating that the virtual reality viewing device has moved from a first position to a second position while the virtual reality viewing device is displaying the first series of video frames;
   generating, in response to receiving the motion data, a second series of video frames from the first three-dimensional model representing a second view of the scene depicted in the first stitched video data, the second view of the scene corresponding to at least the second position;
   sending the second series of video frames to the virtual reality viewing device;
   receiving, from the virtual reality viewing device, an indication to change a spatial viewing perspective of the virtual reality viewing device to view the scene depicted in the first stitched video data from a different location within the scene;
   receiving from a second video capture device, in response to the indication to change the spatial viewing perspective of the virtual reality viewing device, second stitched video data, the second stitched video data being generated by the video stitching algorithm that stitches together:
   first video data captured by a first camera of the second video capture device, and
   second video data captured by a second camera of the second video capture device;
   generating a second three-dimensional model by assigning a second three-dimensional coordinate location to a second set of pixels in the second stitched video data;
   generating a third series of video frames from the second three-dimensional model representing a second view of the scene depicted in a first portion of the second stitched video data; and
   sending the third series of video frames formatted to be displayed by the virtual reality viewing device.

2. The system as recited in claim 1, further comprising a plurality of microphones configured to capture audio data during a time at which the first video capture device captures the first video data and the second video data, and wherein the operations further comprise:
   receiving an audio signal that is representative of the audio data;
   synchronizing the audio signal with the first stitched video data by matching a timestamp associated with the audio signal with an identical timestamp associated with the first stitched video data;

analyzing the audio signal to determine a directionality of the audio signal, the directionality of the audio signal corresponding to a location of a source of the audio data with respect to the first video capture device; and associating the audio signal with the first three-dimensional model such that the directionality of the audio signal aligns with a source of the audio signal depicted within the first stitched video data to create localized audio at the virtual reality viewing device.

3. The system as recited in claim 1, wherein the operations further comprise:

sending the first three-dimensional model to the virtual reality viewing device;

associating a first orientation of the virtual reality viewing device with a first view of the first three-dimensional model;

determining that the motion data indicates that the virtual reality viewing device has moved from the first orientation to a second orientation; and associating the second orientation of the virtual reality viewing device with a second view of the first three-dimensional model.

4. The system as recited in claim 1, wherein the sending the first series of video frames to the virtual reality device includes sending the first series of video frames over a network as the first video data is captured by the first camera of the first video capture device and the second video data is captured by the second camera of the first video capture device.

5. A method comprising:

receiving first video data captured by a first video capture device, wherein receiving first video data includes receiving a first representation of a scene that includes a 360-degree view around the video capture device;

generating a first three-dimensional model including at least a portion of the first video data;

sending, at a first time during which the first video capture device is capturing the first video data, the first three-dimensional model to a viewing device configured to render and display the first video data;

receiving a first indication of a first input received via the viewing device, the first input comprising a first command to pause rendering of the first three-dimensional model and to enable virtual movement within a current portion of the first video data being displayed;

receiving motion data indicating a degree of rotation of the viewing device;

based at least partly on the motion data, generating, at a second time during which rendering of the first video data is paused, a second three-dimensional model including at least a second portion of the first video data corresponding to the degree of rotation; and receiving a second indication of a second input received via the viewing device, the second input comprising a second command to resume rendering of the first three-dimensional model.

6. The method as recited in claim 5, further comprising stitching together the first video data, second video data captured by the first video capture device, third video data captured by the first video capture device, and fourth video data captured the first video capture device to create the representation of the scene that includes the 360-degree view around the video capture device that is viewable via the viewing device.

7. The method as recited in claim 5, further comprising: receiving a third indication that the viewing device has rendered the first portion of the first three-dimensional model that corresponds with a first field of view that is a first portion of the 360-degree view; and based at least partly on additional motion data that corresponds to the viewing device rotating horizontally from a first position to a second position through a rotation angle, receiving a fourth indication that the viewing device has rendered a third portion of the three-dimensional model corresponding to a second field of view that is a second portion of the 360-degree view, wherein the second field of view is related to the first field of view by the rotation angle.

8. The method as recited in claim 5, further comprising receiving motion data generated by a gyroscope associated with the video capture device, the motion data representing the video capture device moving from a first position to a second position through a rotation angle, and wherein generating the first three-dimensional model including the first video data includes rotating the three-dimensional model in a direction and distance opposite to the rotation angle.

9. The method as recited in claim 5, wherein generating the three-dimensional model includes generating a three-dimensional cylindrical model, and further comprising creating the three-dimensional cylindrical model by mapping the video data onto a three-dimensional cylinder.

10. The method as recited in claim 5, further comprising:
receiving second video data captured by a second video capture device;
generating a second three-dimensional model including the second video data; and
sending the second three-dimensional model to the viewing device;
wherein sending the second three-dimensional model is at least in part in response to receiving, from the viewing device, a request to view video data captured by the second video capture device.

11. The method as recited in claim 5, further comprising:
receiving an audio signal that is representative of audio data captured by at least one microphone associated with the first video capture device; and
synchronizing the audio signal with the first video data by matching a timestamp associated with the audio signal with an identical timestamp associated with the first video data.

12. The method as recited in claim 11, further comprising:
determining a directionality of the audio signal relative to the first video capture device; and
aligning the audio signal with the first video data such that the directionality of the audio signal corresponds with a source of the audio signal depicted in the first video data to generate localized audio at the viewing device.

13. The method as recited in claim 5, further comprising:
receiving, from the viewing device, a first audio signal generated by a first microphone associated with the viewing device;
sending, to the first video capture device, the first audio signal;
causing first audio data associated with the first audio signal to be audibly output via a first speaker associated with the first video capture device;
receiving, from the first video capture device, a second audio signal generated by a second microphone associated with the first video capture device;
sending, to the viewing device, the second audio signal; and
causing second audio data associated with the second audio signal to be audibly output via a second speaker associated with the viewing device.

14. A system comprising:
memory;
one or more processors; and
one or more computer-executable instructions stored in the memory and executable by the one or more processors to perform operations comprising:
    determining that a first video capture device is within a predetermined distance of a second video capture device within an environment;
    determining first stitched video data associated with the first video capture device;
    determining second stitched video data associated with the second video capture device;
    generating, based upon at least one of the first stitched video data and the second stitched video data, a three-dimensional model of the environment;
    sending the three-dimensional model of the environment to a viewing device;
    receiving a first indication that the viewing device has rendered a first portion of the three-dimensional model of the environment;
    receiving motion data indicating that the viewing device has moved from a first position to a second position;
    receiving a second indication that the viewing device has rendered a second portion of the three-dimensional model of the environment based at least partly on the motion data, the second portion corresponding to at least the second position; and
    causing display of the second portion of the three-dimensional model of the environment via the viewing device.

15. The system as recited in claim 14, where in the operations further comprise:
    presenting to a user associated with the viewing device, a listing of perspectives that are available within the three-dimensional model of the environment for viewing with the viewing device, the perspectives being associated with at least one of the first video capture device or the second video capture device.

16. The system as recited in claim 15, wherein the operations further comprise:
    receiving, from the viewing device, a third indication to change the perspective displayed at the viewing device; and
    receiving a fourth indication that the viewing device has rendered, based at least partly on the third indication to change the perspective, a third portion of the three-dimensional model of the environment corresponding to third stitched video data associated with a third video capture device that is within the predetermined distance of the first video capture device and the second video capture device.

17. The system as recited in claim 14, wherein the operations further comprise determining that the motion data corresponds with a first linear movement of the viewing device, and wherein rendering the second portion of the three-dimensional model of the environment results in a second linear movement within the three-dimensional model of the environment that corresponds to the first linear movement.

18. The system as recited in claim 14, wherein the operations further comprise determining that the first portion of the three-dimensional model of the environment corresponds with a field of view of the environment in which the first video capture device and the second video capture device are located.

19. The system as recited in claim 18, wherein the operations further comprise determining that a movement of the viewing device results in a different perspective of the field of view that is displayed via the viewing device.

20. The system of claim 14, wherein the operations further comprise:
    receiving an audio signal that is representative of first audio data captured by at least one microphone associated with the first video capture device;
    synchronizing the audio signal with the first stitched video data by matching a first timestamp associated with the audio signal with a second timestamp that is associated with the first stitched video data and that is identical to the first timestamp; and
    causing second audio data associated with the audio signal to be audibly output via at least one speaker associated with the viewing device.

* * * * *